United States Patent
Tseng

(10) Patent No.: US 10,345,120 B2
(45) Date of Patent: Jul. 9, 2019

(54) SCANNING LIGHT-GUIDING ENCODER

(71) Applicant: Hsin-Te Tseng, Taipei (TW)

(72) Inventor: Hsin-Te Tseng, Taipei (TW)

(*) Notice: Subject to any disclaimer, the term of this patent is extended or adjusted under 35 U.S.C. 154(b) by 17 days.

(21) Appl. No.: 15/485,442

(22) Filed: Apr. 12, 2017

(65) Prior Publication Data

US 2017/0299412 A1    Oct. 19, 2017

(30) Foreign Application Priority Data

Apr. 15, 2016   (TW) .............................. 105111838 A

(51) Int. Cl.
| | | |
|---|---|---|
| *G01D 5/347* | (2006.01) | |
| *G06F 3/03* | (2006.01) | |
| *G06F 3/0354* | (2013.01) | |
| *G06F 3/0362* | (2013.01) | |

(52) U.S. Cl.
CPC ......... *G01D 5/3473* (2013.01); *G06F 3/0312* (2013.01); *G06F 3/0362* (2013.01); *G06F 3/03543* (2013.01); *G01D 5/34715* (2013.01)

(58) Field of Classification Search
CPC .. G01D 5/26; G01D 5/32; G01D 5/34; G01D 5/342; G01D 5/347; G01D 5/34707; G01D 5/34715; G01D 5/34723; G01D 5/34738; G01D 5/3473; G06F 3/0312; G06F 3/033; G06F 3/0362; G06F 3/03541

See application file for complete search history.

(56) References Cited

U.S. PATENT DOCUMENTS

| | | | | |
|---|---|---|---|---|
| 3,598,493 A | * | 8/1971 | Fisher ................... | G01D 5/347 250/231.16 |
| 3,770,970 A | * | 11/1973 | Trump .................... | H03M 1/30 250/231.14 |
| 4,819,051 A | * | 4/1989 | Jacobson ................. | G01D 5/38 250/231.13 |
| 4,820,918 A | * | 4/1989 | Igaki ...................... | G01D 5/347 250/231.13 |
| 5,124,548 A | * | 6/1992 | Igaki ...................... | G01D 5/347 250/231.16 |
| 5,168,268 A | * | 12/1992 | Levy ...................... | G06F 3/0312 250/231.14 |
| 5,384,460 A | * | 1/1995 | Tseng .................. | G01D 5/34715 250/227.31 |
| 5,483,059 A | * | 1/1996 | Igaki ...................... | G01D 5/347 250/231.16 |
| 5,691,534 A | * | 11/1997 | Tseng .................. | G01D 5/34715 250/231.14 |
| 5,969,344 A | * | 10/1999 | Tseng ....................... | G01D 5/34 250/231.13 |
| 6,100,519 A | * | 8/2000 | Wang .................... | G01D 5/347 250/231.13 |

(Continued)

*Primary Examiner* — John R Lee
(74) *Attorney, Agent, or Firm* — Li & Cai Intellectual Property (USA) Office

(57) ABSTRACT

The instant disclosure provides a scanning light-guiding encoder by forward focusing including a light-guiding grating wheel, a light-emitting module and an optical sensing module. The light-emitting module is surrounded by the light-guiding grating wheel. The optical sensing module includes a plurality of sensor elements adjacent to the light-guiding grating wheel, and a plurality of exposed sensor areas of the plurality of sensor elements are offset in the transverse direction and are arranged along a plurality of different horizontal lines parallel to each other.

16 Claims, 23 Drawing Sheets

(56) References Cited

U.S. PATENT DOCUMENTS

| | | | | |
|---|---|---|---|---|
| 6,127,676 | A * | 10/2000 | Tseng | G01D 5/34715 250/231.13 |
| 6,194,708 | B1 * | 2/2001 | Wang | G01D 5/34707 250/231.13 |
| 6,703,602 | B1 * | 3/2004 | Hao | G01D 5/34746 250/231.13 |
| 6,803,560 | B1 * | 10/2004 | Okumura | G01D 5/38 250/231.13 |
| 6,903,661 | B1 * | 6/2005 | Tseng | G01D 5/34715 341/2 |
| 7,358,865 | B2 * | 4/2008 | Igaki | G01D 5/34715 250/231.13 |
| 8,035,615 | B2 * | 10/2011 | Bohn | G06F 3/03543 200/564 |
| 9,518,846 | B2 * | 12/2016 | Sakata | G01D 5/34715 |
| 2004/0183701 | A1 * | 9/2004 | Mitamura | G01D 5/34715 341/13 |
| 2005/0128107 | A1 * | 6/2005 | Tseng | G01D 5/34715 341/13 |
| 2006/0097141 | A1 * | 5/2006 | Kiriyama | G01D 5/34715 250/231.13 |
| 2008/0316492 | A1 * | 12/2008 | Cheng | G01D 5/34723 356/445 |
| 2015/0060653 | A1 * | 3/2015 | Yaku | G01D 5/34723 250/231.1 |
| 2017/0227383 | A1 * | 8/2017 | Tseng | G01D 5/34707 |
| 2017/0299412 | A1 * | 10/2017 | Tseng | G01D 5/3473 |

* cited by examiner

SCANNING LIGHT-GUIDING ENCODER

BACKGROUND

1. Technical Field

The instant disclosure relates to an encoder, and in particular, to a scanning light-guiding encoder by forward focusing.

2. Description of Related Art

The monitors in the existing art use mice to move the location of the data intended for processing. A mouse generally includes two sets of X and Y axes encoders for outputting sequential logic signals (such as 11, 10, 00, 01). The sequential logic signals are generated by abutting the mouse against the table surface or other surfaces and moving the mouse toward specific directions, thereby moving a data location of the monitor to a different location. The principle of the use of a mouse is to generate a movement of a point on a plane by the operation of the X and Y axis encoder. In other words, the operation of only one of the X axis encoder and the Y axis encoder only allows the movement of a point on a line. The encoder generally includes a light-emitting module (such as a light-emitting diode), a grating wheel (including blades) and an optical sensing module. The grating wheel has a structure similar to a mechanical gear which, when rotating, either shields the light generated by the light-emitting module or allows the light to pass through. When the light is shielded by the grating wheel, the optical sensing module generates an OFF (0) signal; and when the light passes through the grating wheel and is received by the optical sensing module, the optical sensing module generates an ON (1) signal. The OFF (0) and ON (1) signals are sequentially generated and form a sequential signal. For example, when the grating wheel rotates clockwisely, the sequential signal generated by the optical sensing module can be a continuous and repeated signal including 11, 10, 00, 01, 11, 10, 00, 01 . . . , and when the grating wheel rotates counter-clockwisely, the signals generated can be 01, 00, 10, 11, 01, 00, 10, 11, 10 . . . . These signals can be used in circuit cording.

Generally, the resolution (CPR, count per round) of the encoder increases when the number of the blades increases and the distance between two sensors decreases. However, when the included angle between two blades decreases, i.e., when the number of the blades increases, the outer diameter of the grating wheel increases. If the outer diameter of the grating wheel is fixed, when the number of the blades increases, the width of each of the blades decreases. However, due to the diffraction of the light, the extent that the width of the blades can be decreased is also limited. Specifically, when the light passing the blades diffracts and is not shielded by the blades, the signals generated by the two sensors of the optical sensing module will invariably be ON (1) signals, regardless of the rotating direction of the grating wheel. Therefore, the mouse is unable to generate different sequential signals according to the movement thereof.

FIG. 1A is the schematic view of the arrangement of a light-guiding encoder of the existing art. FIG. 1B shows a partial view of the blades of the light-guiding grating wheel 1a and the optical sensing module 3a of the light-guiding encoder of the existing art. The light-guiding encoder of the existing art includes the light-guiding grating 1a, a light-emitting module 2a and the optical sensing module 3a. In order to overcome the problem related to the diffraction of light, the encoder employs a light-guiding grating wheel 1a having a plurality of spherical surfaces S arranged continuously as a light-emitting surface for focusing the light emitted by the light-emitting module 3a. As shown in FIG. 1B, the optical sensing module 3a includes the optical sensing chips S1, S2 arranged on the same vertical axis. The light emitted from the light-guiding grating wheel 1a is focused at the optical sensing chips S1, S2 of the optical sensing module 3a. Specifically, the light-guiding grating wheel 1a of the light-guiding encoder in the existing art can generate the signals of [1, 1], [0, 1], [1,0] and [0,0] upon rotating to the first position (1), the second position (2), the third position (3) and the fourth position (4) respectively. However, as shown in FIG. 1B, the light-guiding grating wheel 1a in the existing art has to employ two blades for generating a set of coding sequence including four signals.

In sum, since the width of the light beam decreases after passing the spherical surfaces due to the focusing principle, the distance between the optical sensing module 3a and the light-guiding grating wheel 1a needs to be controlled to ensure that the light is received by the optical sensing module 3a, thereby generating the signal. In addition, in the existing art, the optical sensing chips S1, S2 of the optical sensing module 3a are arranged along a same vertical axis, and hence, the light-guiding grating wheel 1a employs two blades to complete a coding sequence [1,1], [0, 1], [1, 0] and [0, 0]. Therefore, the resolution of the light-guiding encoder cannot be significantly improved.

Therefore, there is a need in the art for improving the resolution of the light-guiding encoder while not increasing the dimension of the grating wheel and the number of the blades.

SUMMARY

An embodiment of the instant disclosure provides scanning light-guiding encoder by forward focusing, comprising a light-guiding grating wheel, a light-emitting module and an optical sensor module. The light-emitting module surrounded by the light-guiding grating wheel. The optical sensor module includes a plurality of sensor elements adjacent to the light-guiding grating wheel. A plurality of exposed sensing areas of the plurality of sensor elements are offset in a transverse direction and are arranged along a plurality of different horizontal lines parallel to each other.

Another exemplary embodiment of the instant disclosure provides scanning light-guiding encoder by forward focusing comprising a light-guiding grating wheel, a light-emitting module and an optical sensing module. The light-guiding grating wheel includes a light-guiding body and a gear-like structure, in which the gear-like structure has a plurality of aspherical projections. The light-emitting module is surrounded by the light-guiding grating wheel. The optical sensing module is adjacent to the light-guiding grating wheel. An incident light generated by the light-emitting module passes through the light-guiding grating wheel for forming a parallel light or a near parallel light projected onto the optical sensing module. A width of the parallel light or the near parallel light is variable in accordance with a curvature of a top curved surface of the aspherical projections.

Another exemplary embodiment of the instant disclosure provides a scanning light-guiding encoder by forward focusing comprising a light-guiding grating wheel, a light-emitting module and an optical sensor module. The light-guiding grating wheel includes a light-guiding body and a gear-like structure, in which the gear-like structure has a plurality of projections. The light-emitting module is surrounded by the light-guiding grating wheel. The optical sensing module is adjacent to the light-guiding grating wheel. A width of each of the projections of the gear-like structure is equal to a width of the optical sensing module.

The advantage of the instant disclosure is that the scanning light-guiding encoder by forward focusing employs the design of "each of the sensor elements has an exposed sensing area, and the plurality of exposed sensing areas of the plurality of sensor elements are offset in the transverse direction and are arranged along a plurality of different horizontal lines parallel to each other", and hence, the parallel light or near parallel light projected onto the optical sensing module can cooperate with the exposed sensing areas of the plurality of sensor elements. Therefore, the resolution of the encoder can be improved without increasing the dimension of the light-guiding grating wheel and the number of the blades. In addition, the optical scanning light-guiding encoder can prevent the diffraction of light passing the light-guiding grating wheel.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Figure 1A:
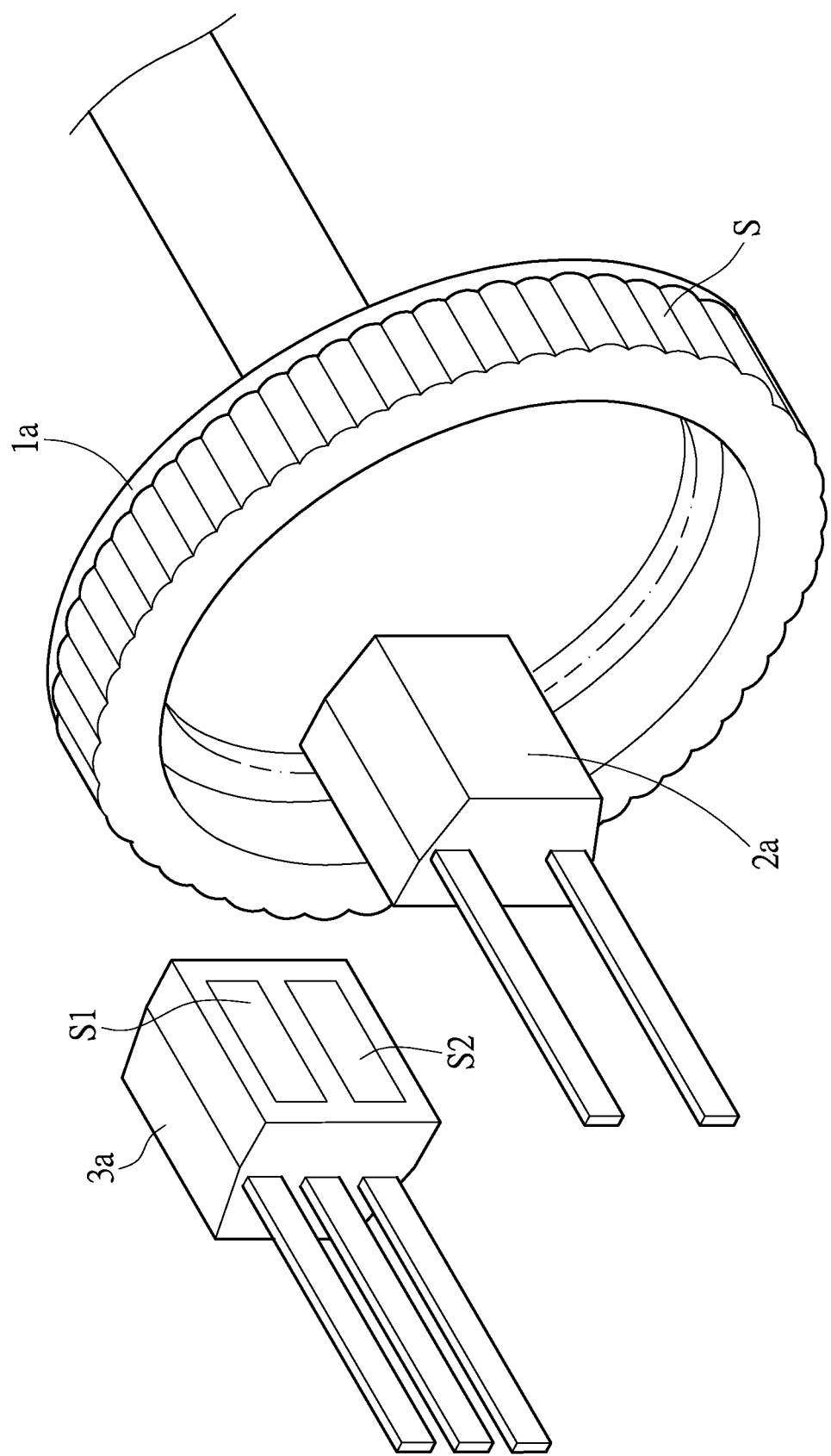
FIG. 1A is a schematic view of the arrangement of a light-guiding encoder of the existing art.
Figure 1B:
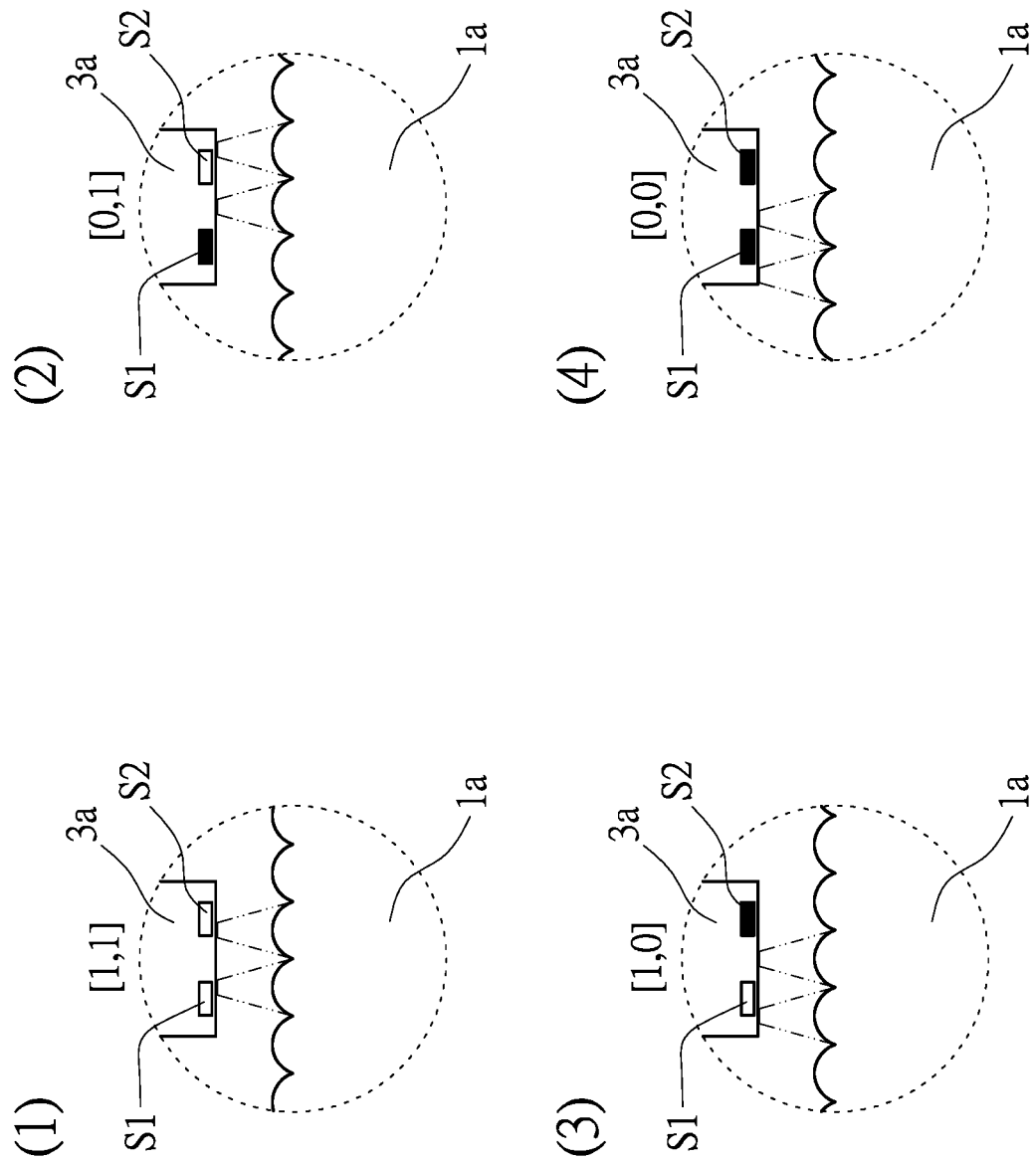
FIG. 1B is a schematic view of the generation of a coding sequence performed by the light-guiding encoder of the existing art.

Reference will now be made in detail to the exemplary embodiments of the instant disclosure, examples of which are illustrated in the accompanying drawings. Wherever possible, the same reference numbers are used in the drawings and the description to refer to the same or like parts.

Figure 2:
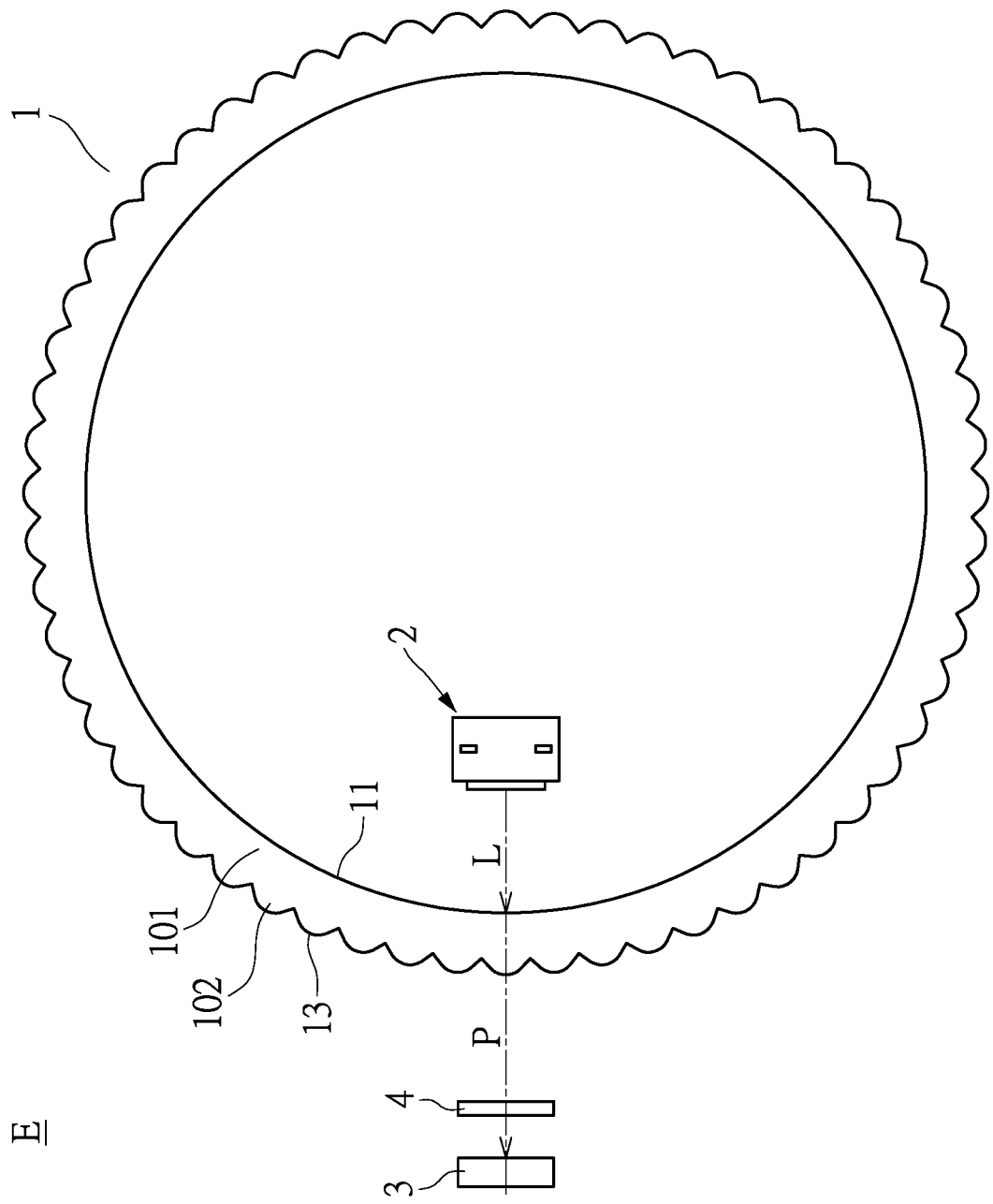
FIG. 2 is a schematic view of the arrangement of an scanning light-guiding encoder by forward focusing provided by an embodiment of the instant disclosure.
Figure 3:
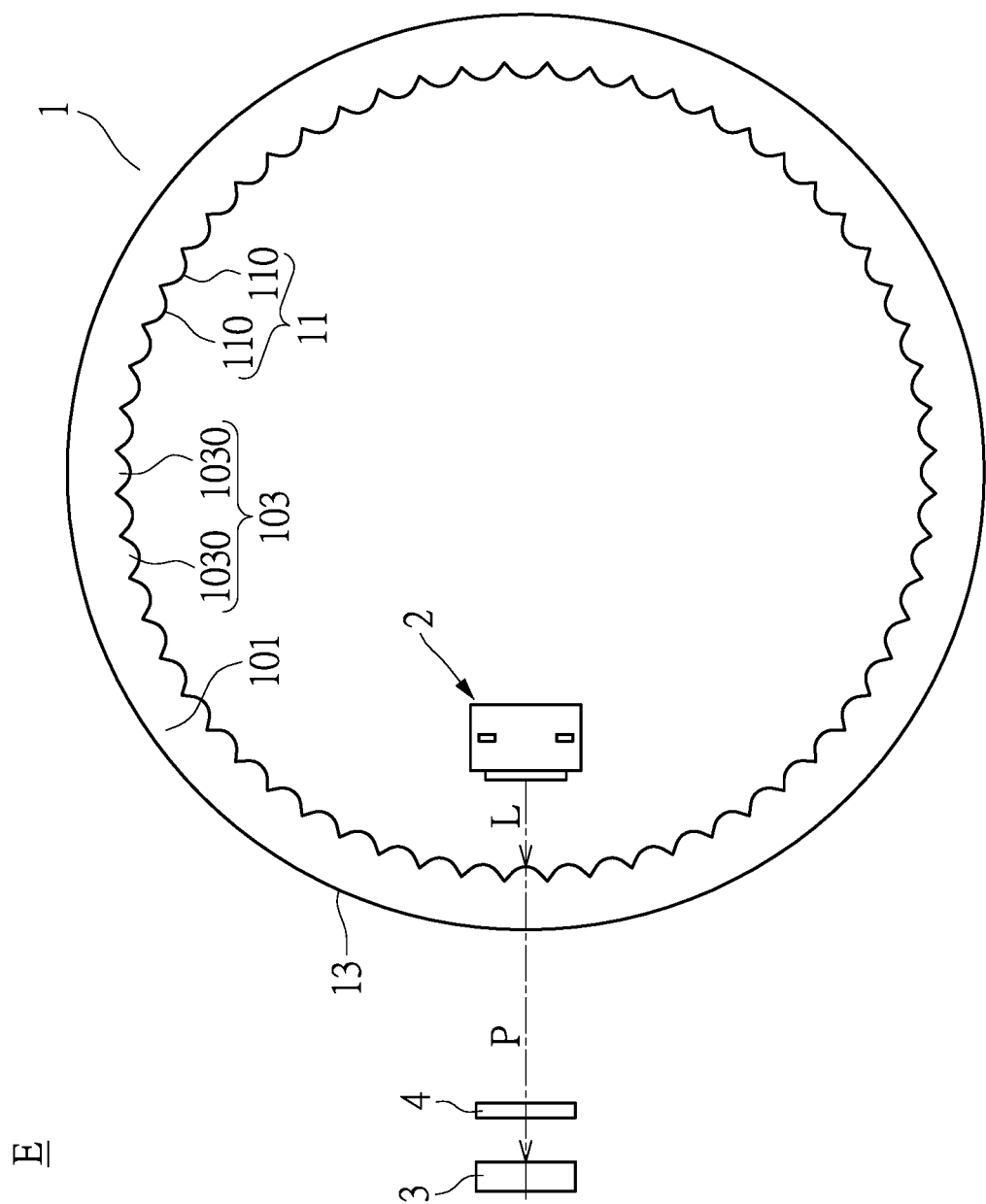
FIG. 3 is a schematic view of the arrangement of an scanning light-guiding encoder by forward focusing provided by another embodiment of the instant disclosure.
Figure 4:
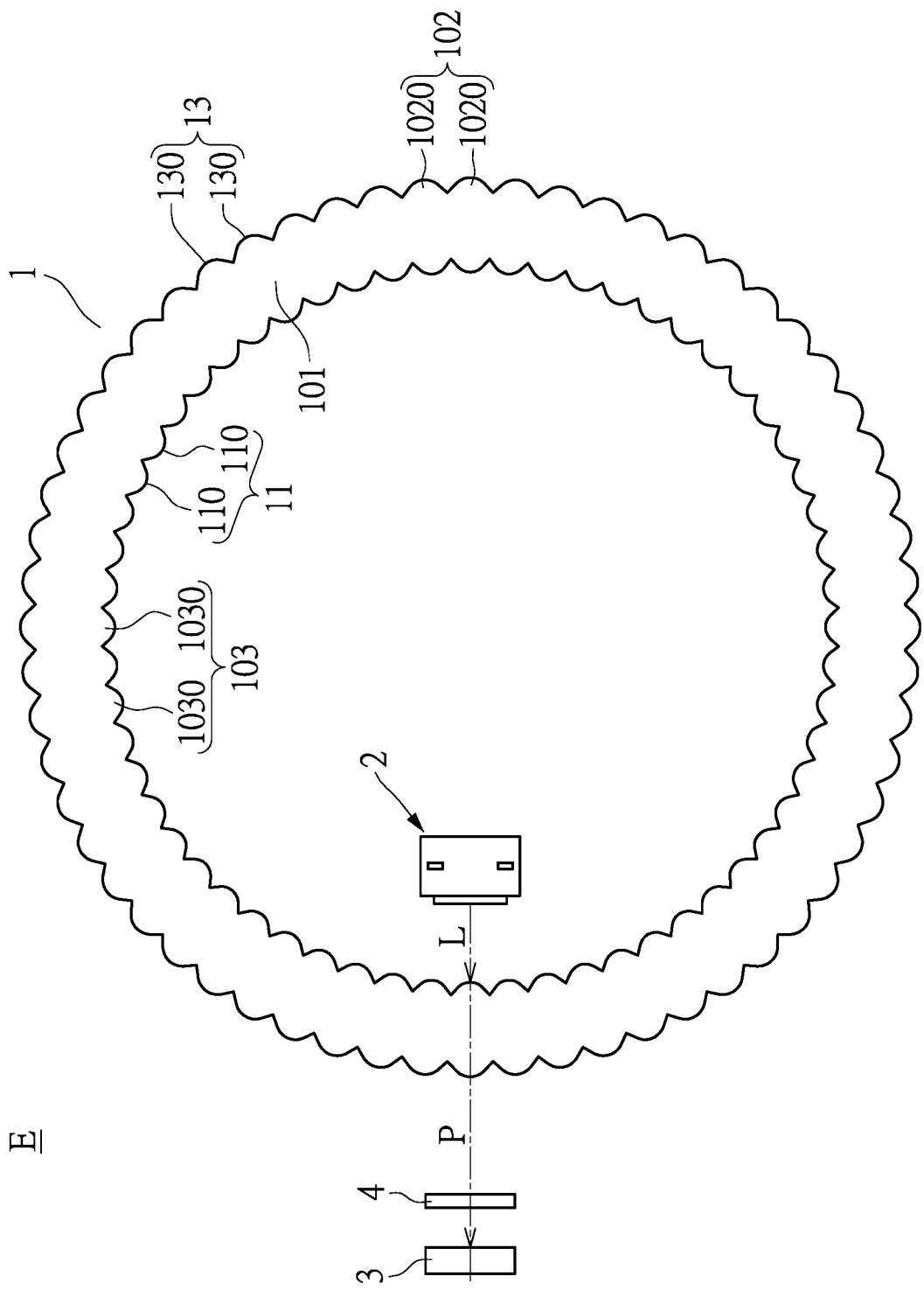
FIG. 4 is a schematic view of the arrangement of an scanning light-guiding encoder by forward focusing provided by yet another embodiment of the instant disclosure.

Referring to FIG. 2 to FIG. 4, the scanning light-guiding encoder by forward focusing E includes a light-guiding grating wheel 1, a light-emitting module 2 and an optical sensing module 3. The light-guiding grating wheel 1 can have a single-layer or a multi-layer structure, i.e., a plurality of light-guiding grating wheels 1 stacked one above another can be used in the instant disclosure. As shown in FIG. 2, in an embodiment, the light-emitting module 2 is surrounded by the light-guiding grating wheel 1, and the light-emitting module 2 and the optical sensing module 3 are disposed on a same straight line. In addition, as shown in FIG. 2 to FIG. 4, the scanning light-guiding encoder by forward focusing E provided by the embodiments of the instant disclosure can further include a grating 4 disposed between the light-guiding grating wheel 1 and the optical sensing module 3. The grating 4 is an optional component. The differences between FIG. 2, FIG. 3 and FIG. 4 reside in the structure of the light-guiding grating wheel 1. The details of the light-guiding grating wheel 1 and the embodiments thereof are described later.

Figure 5:
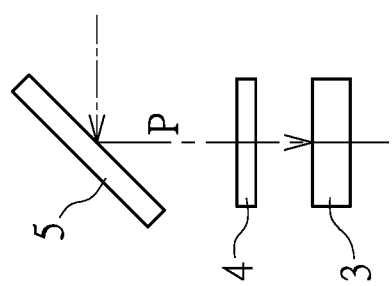
FIG. 5 is a schematic view of a light path of a parallel light or a near parallel light of the scanning light-guiding encoder by forward focusing provided by an embodiment of the instant disclosure.

Referring to FIG. 5, the scanning light-guiding encoder by forward focusing E provided by the instant disclosure can further include a reflected mirror 5. The reflecting mirror 5 is disposed on a side of the light-guiding grating wheel 1 for reflecting the parallel light or the near-parallel light P from the light-guiding grating wheel 1 to pass the grating 4, then emit toward the optical sensing module 3.

Figure 6:
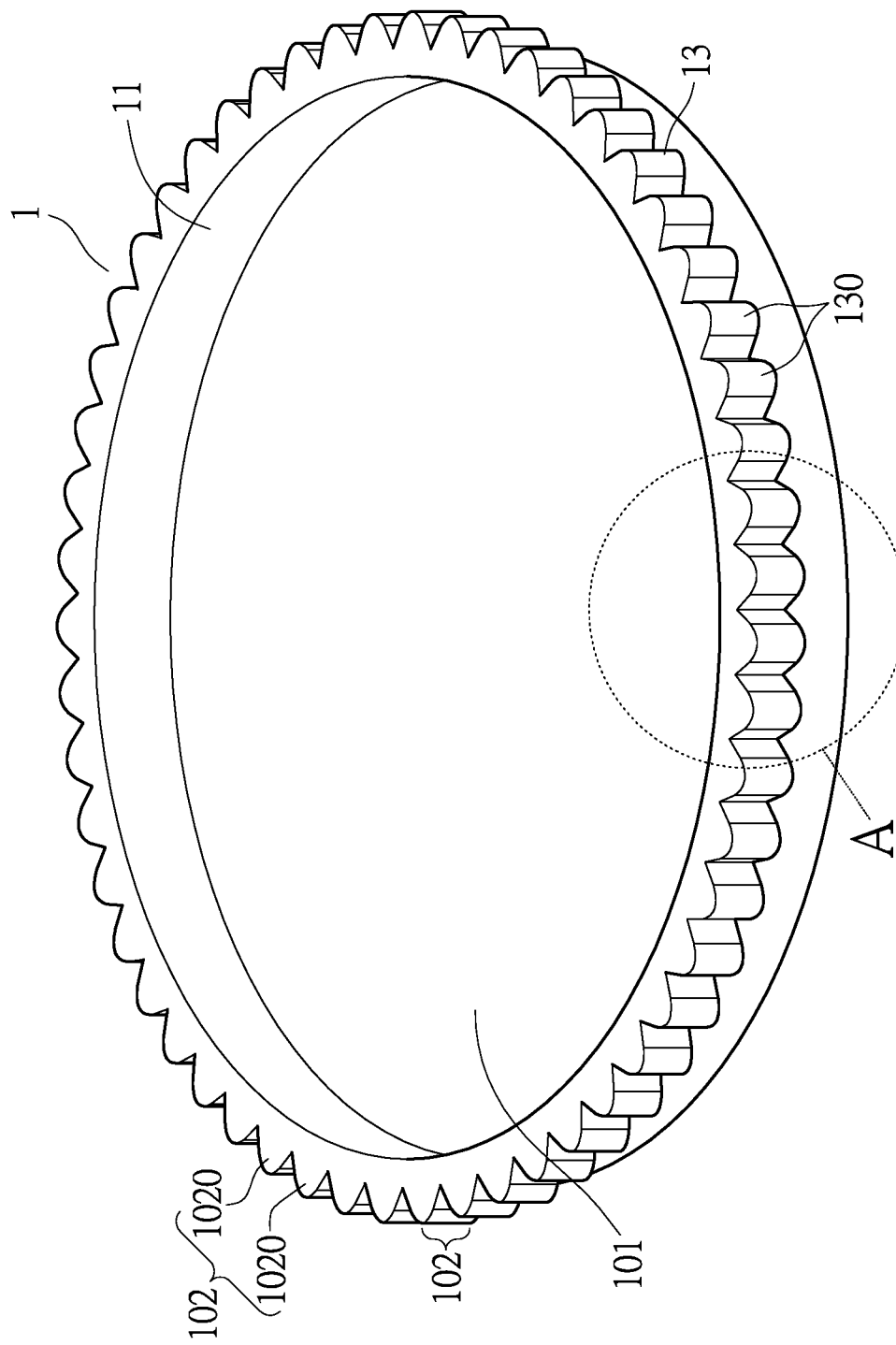
FIG. 6 is a three-dimensional view of a light-guiding grating wheel of the scanning light-guiding encoder by forward focusing provided by an embodiment of the instant disclosure.
Figure 7:
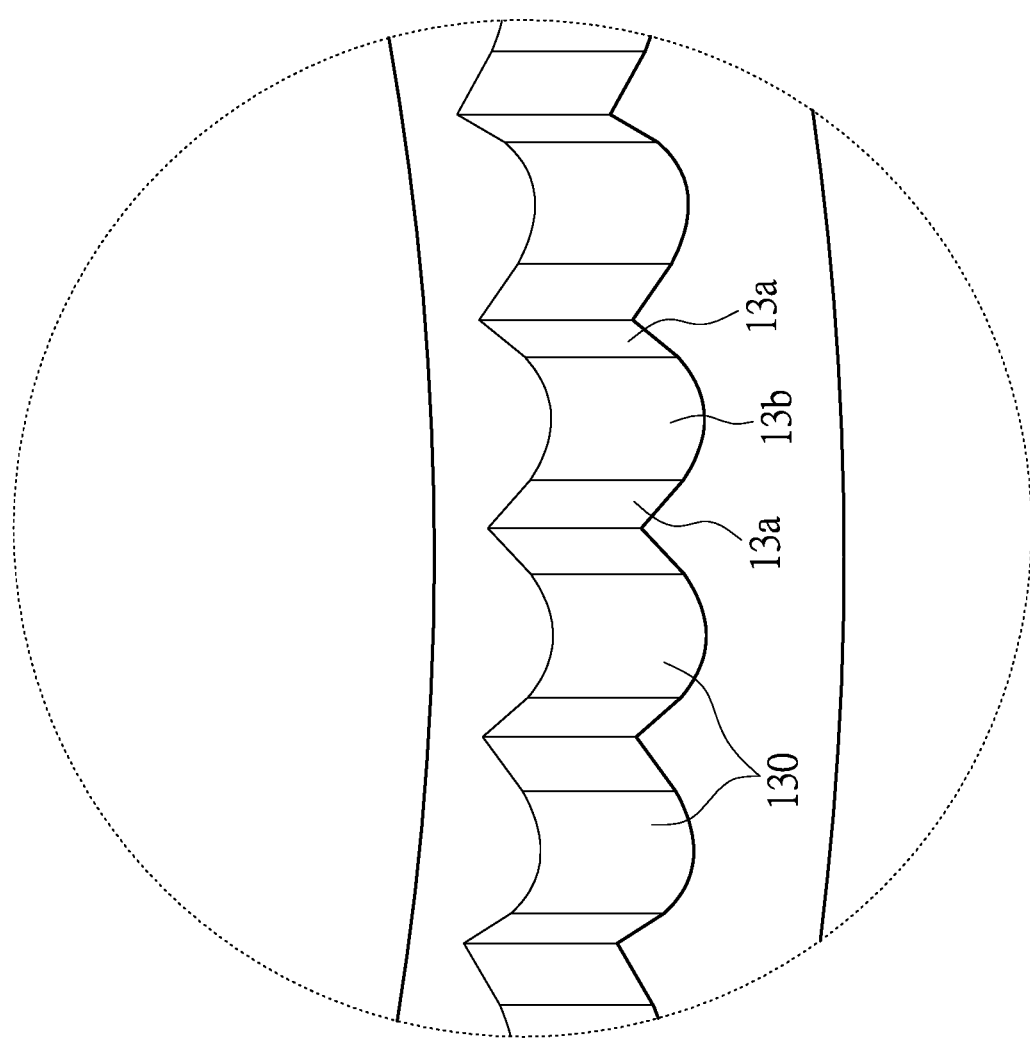
FIG. 7 is an enlarged view of part A in FIG. 6.

Reference is now made to FIG. 6 and FIG. 7. The light-guiding grating wheel 1 of the scanning light-guiding encoder by forward focusing E is made of light-guiding materials. For example, the light-guiding grating wheel 1 can be made of glass, acylic, polycarbonate (PC), or any combination thereof. However, the material of the light-guiding grating wheel 1 is not limited in the instant disclosure.

The light-guiding grating wheel 1 includes a light-guiding body 101 and an outer gear-like structure 102 disposed on the outer surrounding surface of the light-guiding body 101. The inner surrounding surface of the light-guiding body 101 is an annular light-receiving surface 11. The gear-like structure 102 has an annular light-output surface 13 formed of a plurality of aspherical surfaces 130 (or spherical surfaces) connected sequentially. The outer gear-like structure 102 is formed by a plurality of aspherical projections 1020 connected sequentially. In the instant disclosure, the plurality of aspherical projections 1020 can be substituted with spherical projections. Specifically, the annular light-receiving surface 11 facing the light-emitting module 2 is used for receiving light emitted by the light-emitting module 2.

As shown in FIG. 7, the annular light-output surface 13 is formed by a plurality of aspherical surfaces 130 connected sequentially. Each of the aspherical surfaces 130 has two reflecting surfaces 13a and a light-output surface 13b connected between the two reflecting surfaces 13a. The reflecting surfaces 13a can be reflecting plane surfaces, and the light-output surface 13b is an aspherical light-output surface such as hyperboloid, a paraboloid or ellipsoid light-output surfaces.

Figure 9:
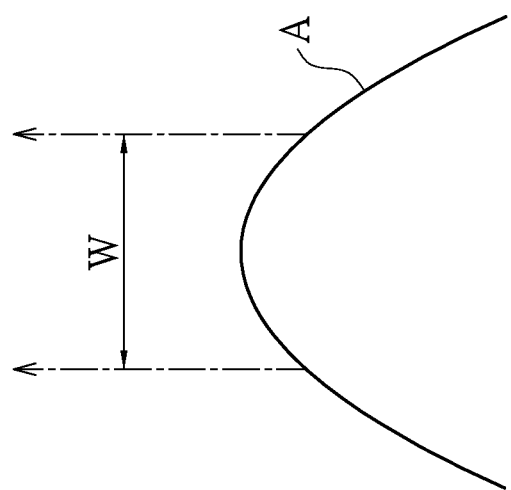
FIG. 9 is a fragmentary view of a gear-like structure of the scanning light-guiding encoder by forward focusing provided by an embodiment of the instant disclosure.
Figure 8:
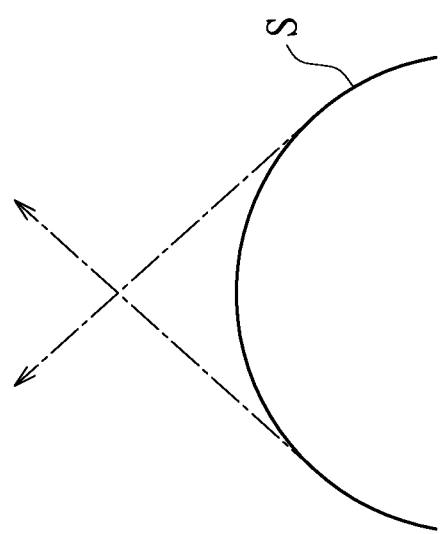
FIG. 8 is a fragmentary schematic view of a gear-like structure of a light-guiding encoder.

Referring to FIGS. 8 and 9, the light-guiding encoder generally employs a spherical structure S having a center of sphere to constitute the light-emitting surface of the grating wheel in an encoder. The light emits from the spherical structure S and projects onto a sensor. However, since the spherical structure S focuses light, the light beam emitted from the spherical structure S is focused and has different widths at different positions.

Different from the spherical structure of a conventional light-guiding encoder, the aspherical structure A shown in FIG. 9 does not have a center of sphere but has a principle axis. A light beam emitted from the aspherical structure A (such as a paraboloid) will be a parallel light or a near parallel light which is substantially a parallel light. The embodiments of the instant disclosure employ the aspherical structure A such as hyperboloid or paraboloid to constitute the light-output surface 13b. Therefore, the annular light-output surface 13 having the aspherical surface 130 can maintain the width W of the light beam leaving the light-guiding grating wheel 1 through the annular light-output surface 13. The parallel light or near parallel light having a constant width W can cooperate with the optical sensing elements or exposed optical sensing areas having specific arrangement for obtaining coding signals with improved resolution. To be specific, since the light beam leaving the light-guiding grating wheel 1 has a constant width W, the resolution of the scanning light-guiding encoder by forward focusing E can be effectively improved by controlling the size and arrangement of the optical sensing element and exposed sensing area of the optical sensing module 3, and the size of the aspherical surface 130 of the optical sensing module 3. The details regarding the cooperation between the annular light-output surface 13 and the exposed sensing areas of the optical sensing elements in the optical sensing module 3 will be described later.

Figure 10:
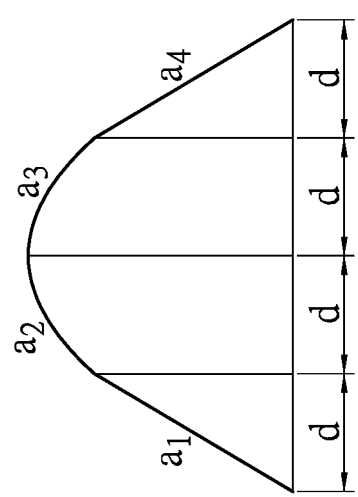
FIG. 10 is a fragmentary sectional view of the structure shown in FIG. 7.

As shown in FIG. 10, each of the aspherical surfaces 130 can have a first surface $a_1$, a second surface $a_2$, a third surface $a_3$ and a fourth surface $a_4$ connected sequentially. Each of the first surface $a_1$ and the fourth surface $a_4$ is a reflecting surface 13a, and the second surface $a_2$ and the third surface $a_3$ connected between the first surface $a_1$ and the fourth surface $a_4$ together form a light-output surface 13b. In the instant disclosure, since the incident angle of the reflected light R projected onto the reflecting surface 13a is equal to the reflecting angle thereof, the reflected light R is reflected and emits toward the inner portion of the light-guiding grating wheel 1. Therefore, the light-output surface 13b (i.e., the second surface $a_2$ and the third surface $a_3$) is the part in the annular light-output surface 13 that allows the reflected light R to pass through. The reflected light R passes through the light-output surface 13b and forms the parallel light or near-parallel light P. On the other hand, if the reflected light R emits toward the reflecting surface 13a (i.e., the first surface $a_1$ or the fourth surface $a_4$) in the annular light-output surface 13, the reflected light R will not be able to pass directly through the light-guiding grating wheel 1. It should be noted that the width of the parallel light or the near parallel light passing the annular light-output surface 13 can be equal to the width of each of the aspherical projections 1020. However, the instant disclosure is not limited thereto.

In addition, the first surface $a_1$, the second surface $a_2$, the third surface $a_3$ and the fourth surface $a_4$ can have a same area of vertical projection. In other words, as shown in FIG. 10, the first surface $a_1$, the second surface $a_2$, the third surface $a_3$ and the fourth surface $a_4$ can have the same projection width d. Under this circumstance, the second surface $a_2$ and the third surface $a_3$ constituting the light-output surface 13b have a projection width that is half of the total projection width. However, the arrangement of the first surface $a_1$, the second surface $a_2$, the third surface $a_3$ and the fourth surface $a_4$ can be adjusted according to actual needs. By adjusting the curvature of the light-output surface 13b, the width of the parallel light or near-parallel light P leaving the light-guiding grating wheel 1 can be adjusted. In other words, the width of the parallel light or near-parallel light P is variable in accordance to the curvature of the top surface of the aspherical projection 1020.

Figure 11:
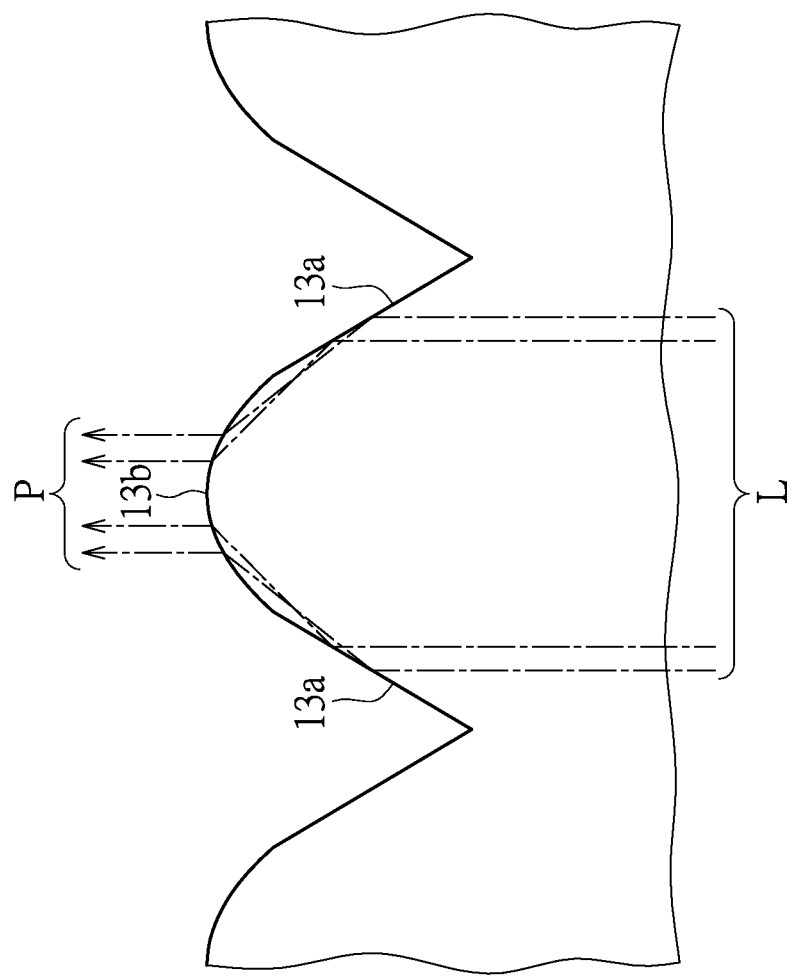
FIG. 11 is another fragmentary sectional view of the structure shown in FIG. 7.

Referring to FIG. 11, the reflecting light R projects onto the reflecting surface 13a (the first surface $a_1$ shown in FIG. 10) and is reflected to emit toward the light-output surface 13b (the second surface $a_2$ and the third surface $a_3$). Afterward, the reflecting light R emits from the aspherical surface 130 of the light-output surface 13b as the parallel light or the near-parallel light P.

based on the above design, when the light-guiding grating wheel 1 rotates, the reflected light R of the embodiments of the instant disclosure can be reflected by a part of the corresponding aspherical surface 130 (the reflecting surfaces 13a), or, the reflected light R can pass through a part of the aspherical surface 130 (the light-output surface 13b) and form the parallel light or near-parallel light P. The parallel light or near-parallel light P can pass through the grating 4 and project onto the optical sensing module 3, thereby forming a circuit coding signal with high resolution.

It should be noted that the light-guiding grating wheel 1 provided by the embodiments of the instant disclosure can have different structural designs. Reference is made to FIG. 3 and FIG. 4. As shown in FIG. 3, the light-guiding grating wheel 1 can includes the light-guiding body 101 and the inner gear-like structure 103 disposed on the inner surrounding surface of the light-guiding body 101. The outer surrounding surface of the light-guiding body 101 is the annular light-output surface 13. The inner gear-like structure 103 has the annular light-receiving surface 11 formed by a plurality of aspherical surfaces 110 connected sequentially and having a principal axis. The inner gear-like structure 103 is formed by a plurality of aspherical projections 1030 connected sequentially. The incident light L generated by the light-emitting module 2 enters the light-guiding grating wheel 1 through the annular light-receiving surface 11 of the inner gear-like structure 103 and passes through the annular light-output surface 13 to form the parallel light or the near-parallel light P projected onto (or "forward focused on") the optical sensing module 3.

In another embodiment, the light-guiding grating wheel 1 as shown in FIG. 4 includes the light-guiding body 101, the outer gear-like structure 102 disposed on the outer surrounding surface of the light-guiding body 101 and the inner gear-like structure 103 disposed on the inner surrounding surface of the light-guiding body 101. The outer gear-like structure 102 has the annular light-output surface 13 formed by a plurality of aspherical projections 1030 connected sequentially. The outer gear-like structure 102 is formed by a plurality of aspherical projections 1020 connected sequentially. The inner gear-like structure 103 has an annular light-receiving surface 11 formed by a plurality of aspherical surfaces 110 connected sequentially and having a principal axis, and the inner gear-like structure 103 is formed by a plurality of aspherical projections 1030 connected sequentially. The incident light L generated by the light-emitting module 2 enters the light-guiding grating wheel 1 through the annular light-receiving surface 11 of the inner gear-like structure 103 and passes through the annular light-output surface 13 of the outer gear-like structure 102 to form the parallel light or the near-parallel light P projected onto the optical sensing module 3.

Regarding the light-guiding wheels 1 shown in FIG. 3 and FIG. 4, similar to the aspherical surfaces 130 of the annular light-output surface 13, the aspherical surfaces 110 of the annular light-receiving surface 11 can has two reflecting surfaces and a light-output surface connected between the two reflecting surfaces. In addition, the reflecting surfaces can be reflecting planes and the light-output surface can be an aspherical surface such as a hyperboloid, a paraboloid or ellipsoid light-output surfaces. Therefore, the annular light-receiving surface 11 can generate an optical effect similar to the annular light-output surface 13.

Reference is made to FIG. 2. The light-emitting module 2 is surrounded by the annular light-receiving surface 11 for generating an incident light L emitting toward the annular light-receiving surface 11. For example, the light-emitting module 2 can be at least a light-emitting diode. However, the implementation of the light-emitting module 2 is not limited thereto.

As shown in FIG. 2, the optical sensing module 3 can be disposed beside the annular light-output surface 13 for receiving the parallel light or near-parallel light P passing through the light-output surface 13b in the aspherical surface 130 of the annular light-output surface 13. In another implementation, as shown in FIG. 5, the optical sensing module 3 can be disposed at a side near the annular light-receiving surface 11 of the light-guiding grating wheel 1, and a reflecting mirror 5 is employed to reflect the parallel light or near-parallel light P emitted from the light-output surface 13b in the aspherical surface 130 of the annular light-output surface 13.

The implementation of the optical sensing module 3 is variable in accordance to the presence of the grating 4. For example, when the scanning light-guiding encoder by forward focusing E does not include a grating 4, the optical sensing module 3 includes a plurality of sensing elements for receiving the parallel light or near-parallel light P emitted from the aspherical surface 130. Specifically, the sensing elements of the optical sensing module 3 having specific dimensions are arranged in a specific manner on the surface of the optical sensing module 3 for cooperating with the aspherical surface 130 of the light-guiding grating wheel 1 to generate signals. In an implementation without the grating 4, the plurality of sensing elements are offset in the transverse direction and are arranged along a plurality of different horizontal lines parallel to each other.

When the scanning light-guiding encoder by forward focusing E includes the grating 4, the grating 4 is disposed between the light-guiding grating wheel 1 and the optical sensing module 3, and includes a plurality of slit-like openings. The optical sensing module 3 has a plurality of strip-like sensing elements. The openings expose specific areas of the sensing elements for forming a plurality of exposed sensing areas of the optical sensing module 3.

In order to improve the resolution of the scanning light-guiding encoder by forward focusing E, the width of the plurality of sensing elements and the exposed sensing areas of the sensing elements must be controlled to cooperate with the width of the aspherical projections 1020 or 1030 of the light-guiding grating wheel 1 and the width of the light-output surface 13b. Therefore, the scanning light-guiding encoder by forward focusing E provided by the embodiments of the instant disclosure allows the optical sensing module 3 to generate a complete coding sequence by a single aspherical projection 1020 or 1030 (for example, the signals [0,0], [0,1], [1,0] and [1,1] can be generated by a single aspherical projection 1020 or 1030). The details of the technical means will be described later.

Figure 21:
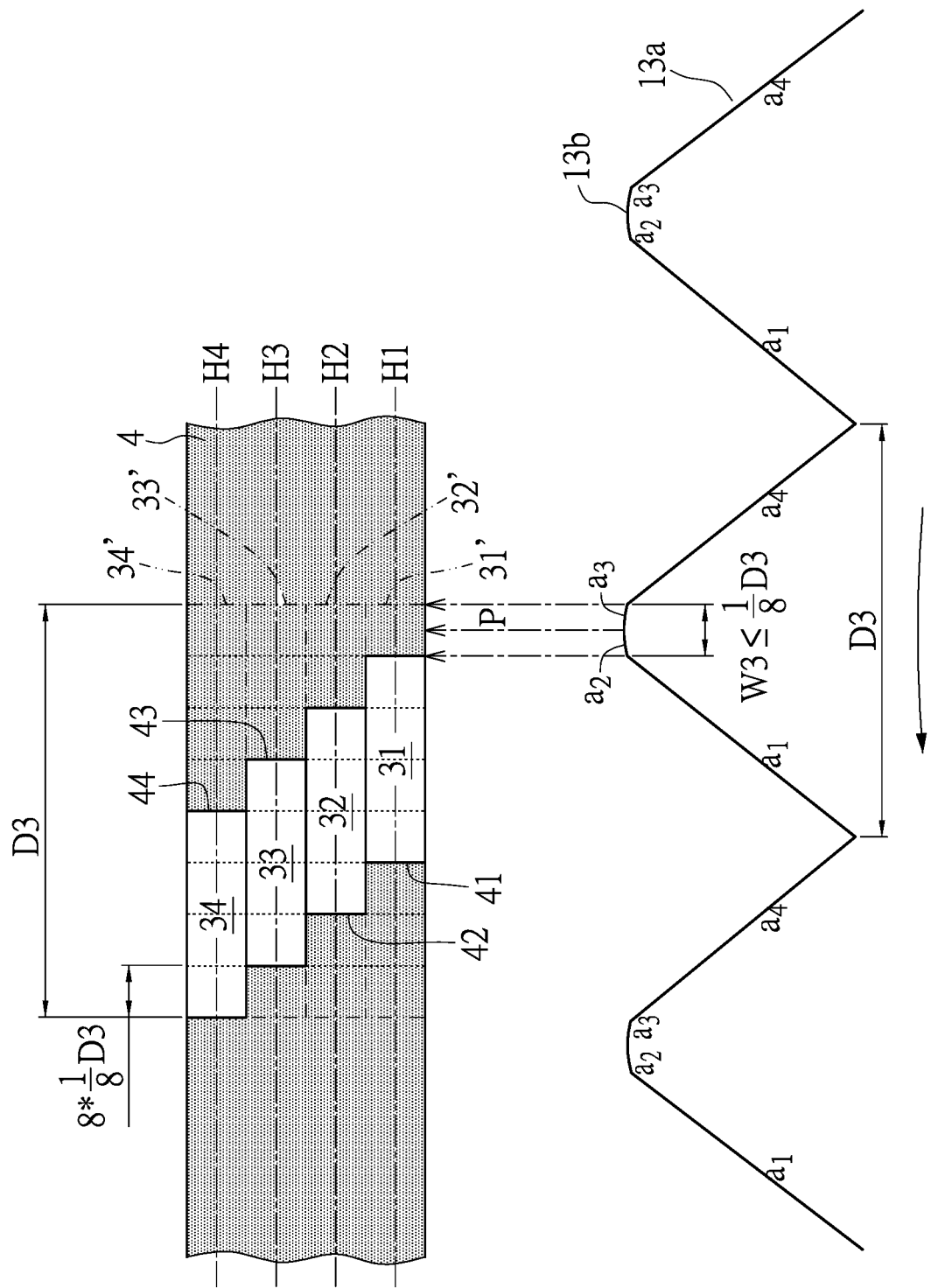
FIG. 21 is a fragmentary schematic view of the relationship between the parallel light or the near parallel light and the optical sensing module when the light-guiding grating wheel of the scanning light-guiding encoder by forward focusing provided by the third embodiment of the instant disclosure rotates to a first position.
Figure 23:
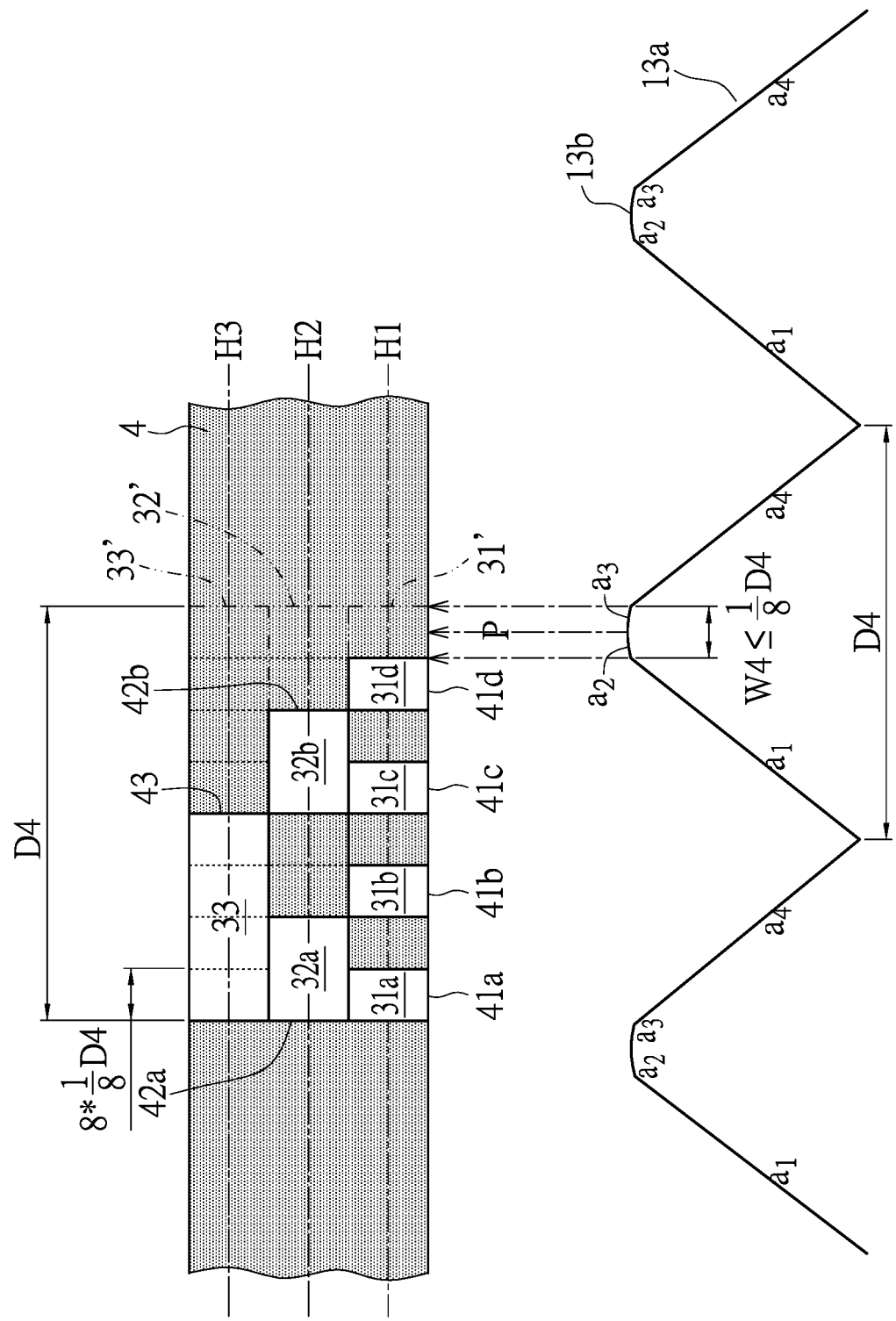
FIG. 23 is a fragmentary schematic view of the relationship between the parallel light or the near parallel light and the optical sensing module when the light-guiding grating wheel of the scanning light-guiding encoder by forward focusing provided by the fourth embodiment of the instant disclosure rotates to a first position.

In the instant disclosure, the number of sensing elements and exposed sensing areas of the optical sensing module 3 can be adjusted according to actual needs. For example, as shown in FIG. 12 to FIG. 15, the optical sensing module 3 includes a first sensing element 31' and a second sensing element 32' parallel to each other for receiving the parallel light or near-parallel light P emitted from the annular light-output surface 13. The signals [0,0], [0,1], [1,0] and [1,1] can be generated in accordance to the receiving status of the parallel light or near-parallel light P. In other words, two sensing elements can generate $2^2$ signals. In addition, as shown in FIG. 21 and FIG. 23, the optical sensing module 3 can also include three or four sensing elements, and each of the sensing elements has one or more exposed sensing areas exposed by the openings of the grating 4.

Furthermore, when the light-guiding grating wheel 1 rotates and the incident light L generated by the light-emitting module 2 enters the light-guiding grating wheel 1 through the annular light-receiving surface 11, the reflected light R passes through a part of the corresponding aspherical surface 130 or 110 (i.e., the light-output surface 13b) for forming the parallel light or near-parallel light P after passing the annular light-output surface 13, or is reflected by the other part of the corresponding aspherical surface 130 or 110 (i.e., the reflecting surface 13a). Therefore, the parallel light or near-parallel light P emitted from the light-guiding grating wheel 1 can be received by the optical sensing module 3 for generating the sequential signals for circuit coding.

The operational details for generation of sequential signals by the optical scanning light-guiding encoder E are provided below in the embodiments of the instant disclosure.

First Embodiment

Reference is made to FIG. 12 to FIG. 15 which show the relationship between the parallel light or the near parallel light P and the optical sensing module 3 when the light-guiding grating wheel 1 of the scanning light-guiding encoder by forward focusing E provided by the first embodiment of the instant disclosure rotates to different positions.

Figure 12:
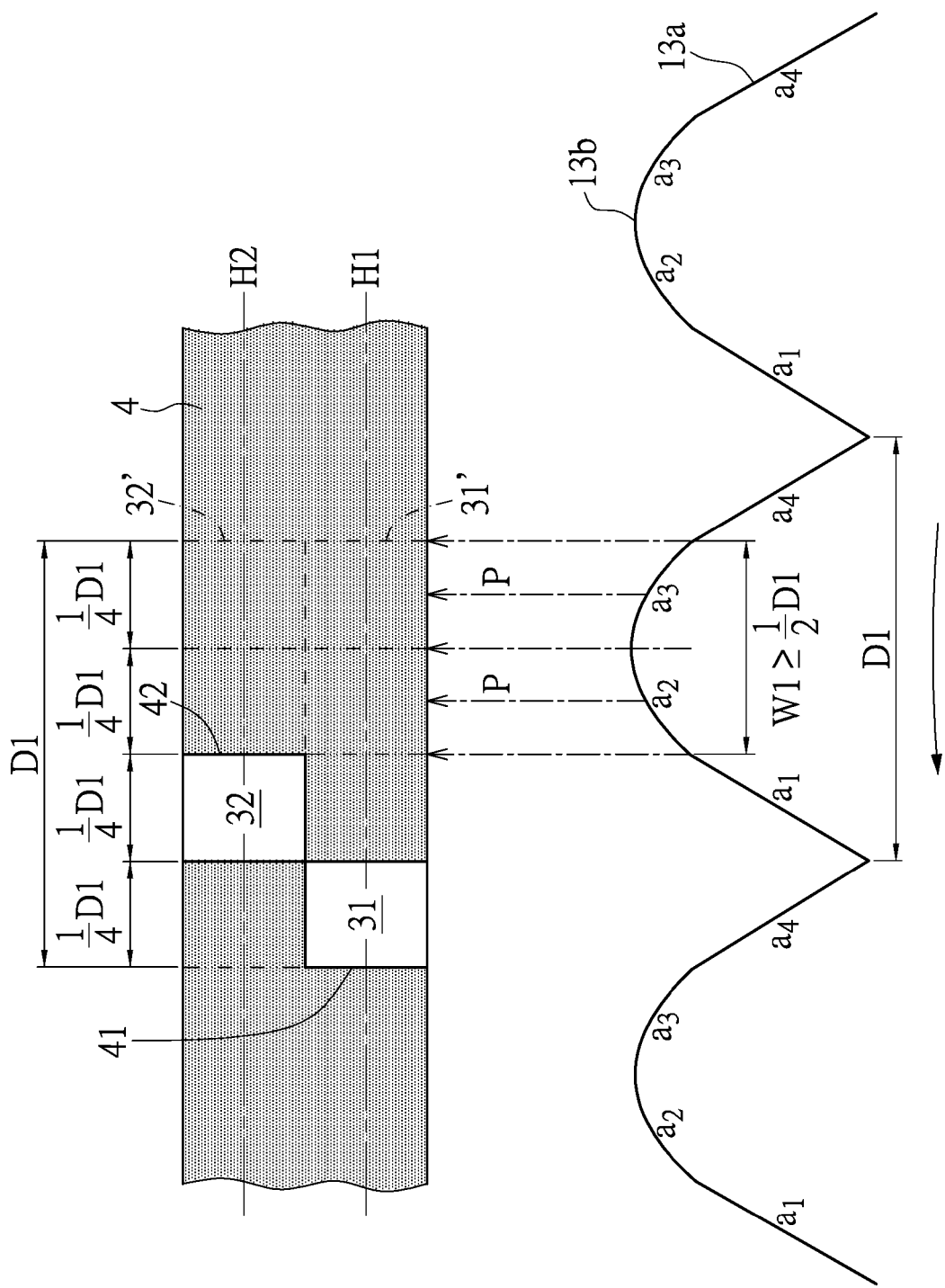
FIG. 12 is a fragmentary schematic view showing the relationship between the parallel light or the near parallel light and the optical sensing module when the light-guiding grating wheel of the scanning light-guiding encoder by forward focusing provided by a first embodiment of the instant disclosure rotates to a first position.

Specifically, as shown in FIG. 12, the optical sensing module 3 includes the first sensing element 31' and the second sensing element 32' (both of which is strip-like), and the two sensing elements have the same width D1 and are flushed at the two ends thereof to allow the optical sensing module 3 to have the same width D1. The optical sensing module 3 and the light-guiding grating wheel 1 have a grating 4 disposed therebetween and having a width larger than D1. The grating 4 is for shielding specific areas of the first sensing element 31' and the second sensing element 32' and exposing the reminder areas. The first opening 41 and the second opening 42 of the grating 4 expose the first exposed sensing area 31 of the first sensing element 31' and the second exposed sensing area 32 of the second sensing element 32' respectively. In this embodiment, the first exposed sensing area 31 and the second opening 42 has a width of ¼ D1, and hence, the first exposed sensing area 31 and the second exposed sensing area 32 also have a width of ¼ D1. The first exposed sensing area 31 and the second exposed sensing area 32 are offset in the traverse direction and are arranged along a plurality of different horizontal lines H1, H2 parallel to each other.

In embodiments of the instant disclosure, the width of the aspherical projections 1020 is the same as the width D1 of the optical sensing module 3. Therefore, each of the aspherical surfaces 130 of the light-guiding grating wheel 1 can correspond to the optical sensing module 3 having the first sensing element 31' and the second sensing element 32' for generating a complete coding sequence by a single aspherical surface 130. In addition, in the first embodiment, the width W1 of the parallel light or near-parallel light P emitted from the light-output surface 13b is larger or equal to half of the width D1 of the optical sensing module 3, i.e., W1≥½ D1. The ratio of the width W1 to the width D1 of the light-guiding grating wheel 1 of the embodiment shown in FIG. 12 to FIG. 15 is W1=½ D1. When the light-output surface 13b of the annular light-output surface 13 rotates to a location corresponding to the first exposed sensing area 31 and the second exposed sensing area 32 (by the rotation of the light-guiding grating wheel 1), i.e, the location shown in FIG. 14, the parallel light or near-parallel light P can project onto the first exposed sensing area 31 and the second exposed sensing area 32. Reference will now be made to FIG. 12 to FIG. 15 to show different states during the rotation of the light-guiding grating wheel 1.

Referring to FIG. 12, the light-guiding grating wheel 1 rotates to a first position. The first exposed sensing area 31 and the second exposed sensing area 32 of the optical sensing module 3 correspond to the fourth surface $a_4$ of one of the aspherical surfaces 130 and the first surface $a_1$ of the next aspherical surface 130 of the light-guiding grating wheel 1 respectively. Since the first surface $a_1$ and the fourth surface $a_4$ are both a reflecting surface 13a, the reflected light R emitting toward the first surface $a_1$ and the fourth surface $a_4$ is reflected by the reflecting surfaces 13a. Therefore, the first exposed sensing area 31 and the second exposed sensing area 32 corresponding to the fourth surface $a_4$ and the first surface $a_1$ do not receive any optical signal, and hence, the optical sensing module 3 generates a [0,0] signal.

Figure 13:
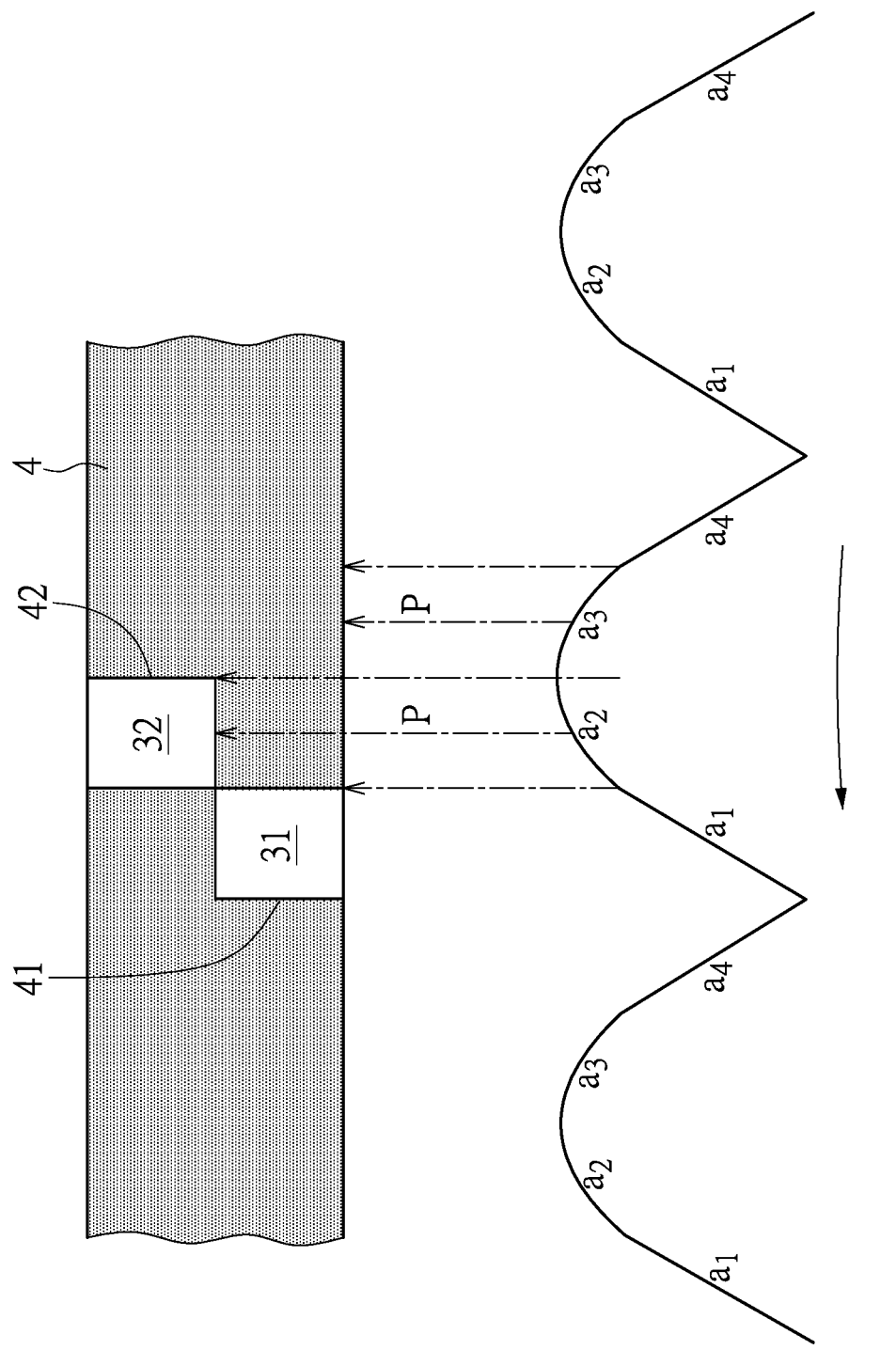
FIG. 13 is a fragmentary schematic view showing the relationship between the parallel light or the near parallel light and the optical sensing module when the light-guiding grating wheel of the scanning light-guiding encoder by forward focusing provided by the first embodiment of the instant disclosure rotates to a second position.

Referring next to FIG. 13, the light-guiding grating wheel 1 rotates to a second position. The first exposed sensing area 31 and the second exposed sensing area 32 of the optical sensing module 3 correspond to the first surface $a_1$ and the second surface $a_2$ of one of the aspherical surfaces 130 of the light-guiding grating wheel 1. The first surface $a_1$ is a reflecting surface 13a, and hence, the reflected light R projected onto the first surface $a_1$ is reflected to the inner portion of the light-guiding grating wheel 1 and cannot leave the light-guiding grating wheel 1 from the reflecting surface 13a. The reflected light R emitting toward the second surface $a_2$ passes through the aspherical surface 130 and forms the parallel light or near-parallel light P. The parallel light or near-parallel light P emits toward the second exposed sensing area 32 corresponding to the second surface $a_2$, and hence, the optical sensing module 3 generates a [0,1] signal. In addition, although the reflected light R can pass through the third surface $a_3$ to form the parallel light or near-parallel light P emitting from the aspherical surface 130, the third surface $a_3$ is not corresponded to any exposed sensing area of the optical sensing module 3 and is blocked by the grating 4, and hence, this part of the parallel light or near-parallel light P does not contribute to the signal generated by the optical sensing module 3.

Figure 14:
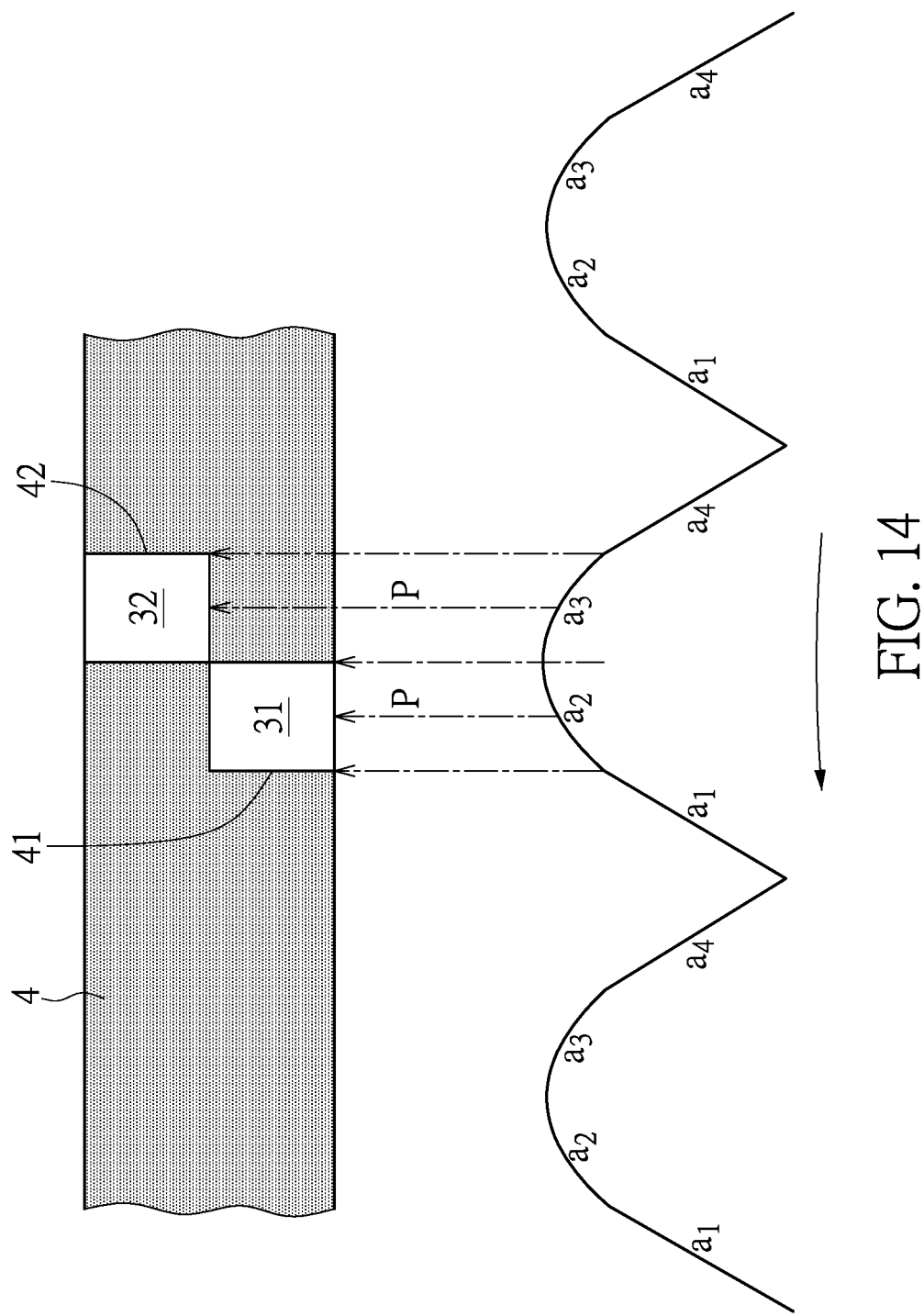
FIG. 14 is a fragmentary schematic view showing the relationship between the parallel light or the near parallel light and the optical sensing module when the light-guiding grating wheel of the scanning light-guiding encoder by forward focusing provided by the first embodiment of the instant disclosure rotates to a third position.

Referring to FIG. 14, the light-guiding grating wheel 1 rotates to a third position. The first exposed sensing area 31 and the second exposed sensing area 32 of the optical sensing module 3 correspond to the second surface $a_2$ and the third surface $a_3$ of one of the aspherical surfaces 130. The reflected light R emits toward the aspherical surface 130 and leaves the light-guiding grating wheel 1 through the light-output surface 13b having the second surface $a_2$ and the third surface $a_3$. The parallel light or near-parallel light P formed by the reflected light R leaving the light-guiding grating wheel 1 emits toward the first exposed sensing area 31 and the second exposed sensing area 32 of the optical sensing module 3, and hence, the optical sensing module 3 generates a [1,1] signal.

Figure 15:
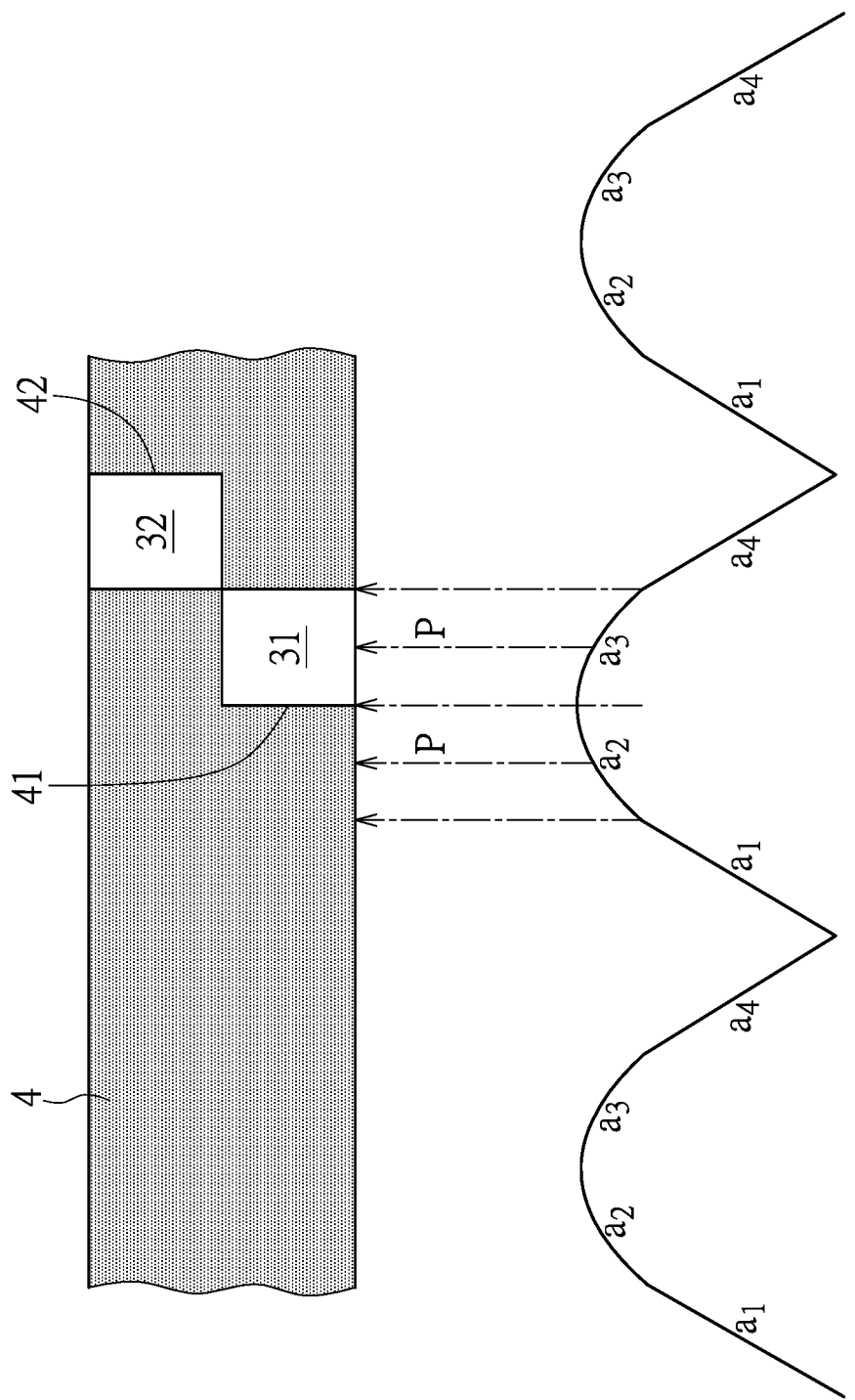
FIG. 15 is a fragmentary schematic view showing the relationship between the parallel light or the near parallel light and the optical sensing module when the light-guiding grating wheel of the scanning light-guiding encoder by forward focusing provided by the first embodiment of the instant disclosure rotates to a fourth position.

Referring to FIG. 15, the light-guiding grating wheel 1 rotates to a fourth position. The first exposed sensing area 31 and the second exposed sensing area 32 of the optical sensing module 3 correspond to the third surface $a_3$ and the fourth surface $a_4$ of one of the aspherical surfaces 130 respectively. The reflected light R emitting toward the third surface $a_3$ passes through the third surface $a_3$ and forms the parallel light or near-parallel light P. The parallel light or near-parallel light P is received by the first exposed sensing area 31. The fourth surface $a_4$ is a reflecting surface 13a, and hence, the reflected light R directly emitting toward the fourth surface $a_4$ is reflected by the fourth surface $a_4$ and cannot leave the light-guiding grating wheel 1 through the fourth surface $a_4$. Therefore, the second exposed sensing area 32 corresponding to the fourth surface $a_4$ cannot receive the optical signal of the parallel light or near-parallel light P. When the light-guiding grating wheel 1 rotates to the fourth position, the optical sensing module 3 generates a [1,0] signal.

As described above, when the light-guiding grating wheel 1 rotates to different positions, based on the design of the reflecting surface 13a and the light-output surface 13b in the aspherical surfaces 130 of the optical sensing module 3, and more importantly, based on the design of the dimensions of the first exposed sensing area 31 and the second exposed sensing area 32 in the optical sensing module 3 in cooperation with the reflecting surface 13a and the light-output surface 13b, the light-guiding grating wheel 1 can generate $2^2=4$ sensing signals by a single aspherical surface 130, thereby significantly increasing the resolution of the scanning light-guiding encoder by forward focusing E.

Second Embodiment

Figure 18:
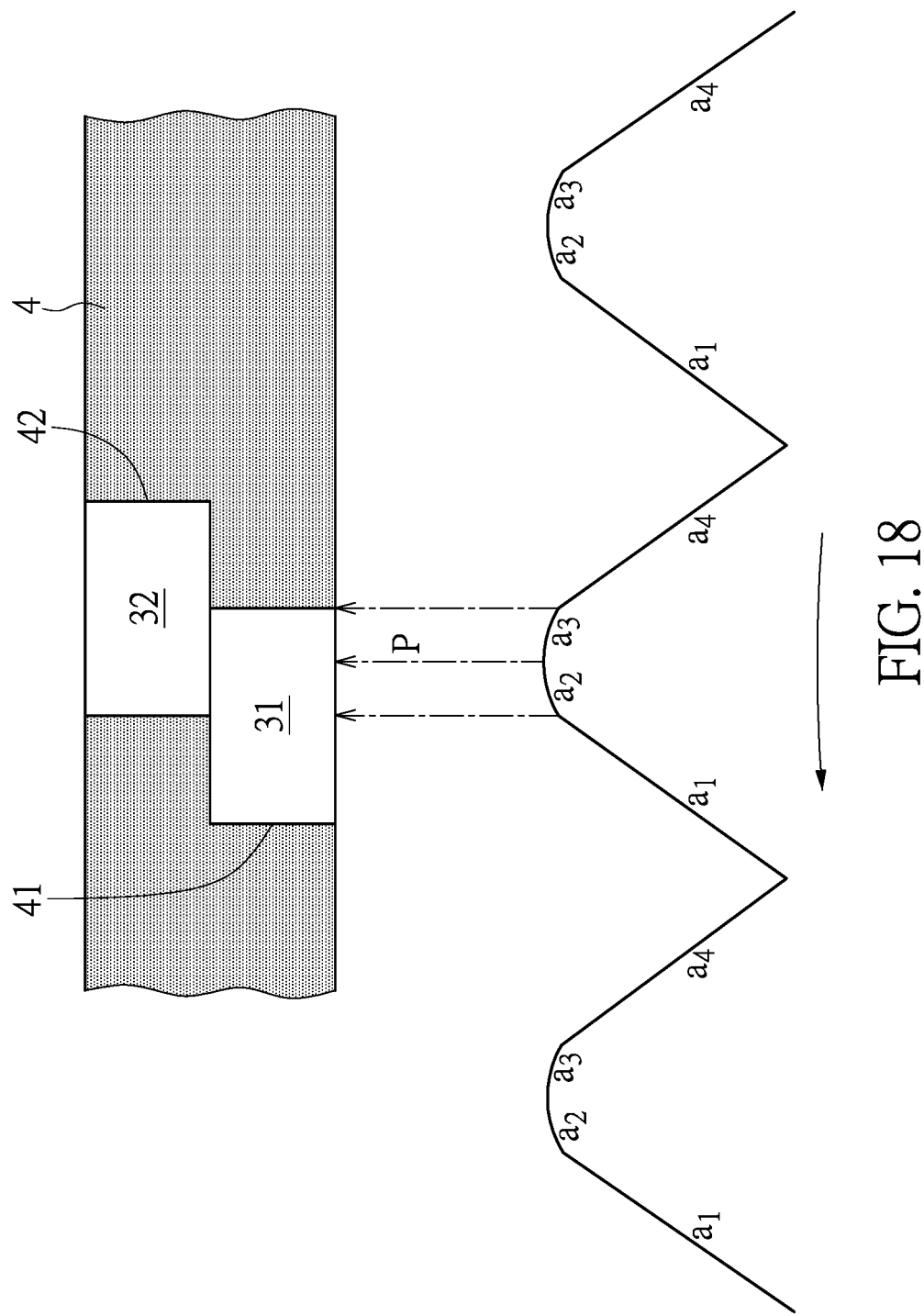
FIG. 18 is a fragmentary schematic view showing the relationship between the parallel light or the near parallel light and the optical sensing module when the light-guiding grating wheel of the scanning light-guiding encoder by forward focusing provided by the second embodiment of the instant disclosure rotates to a third position.
Figure 19:
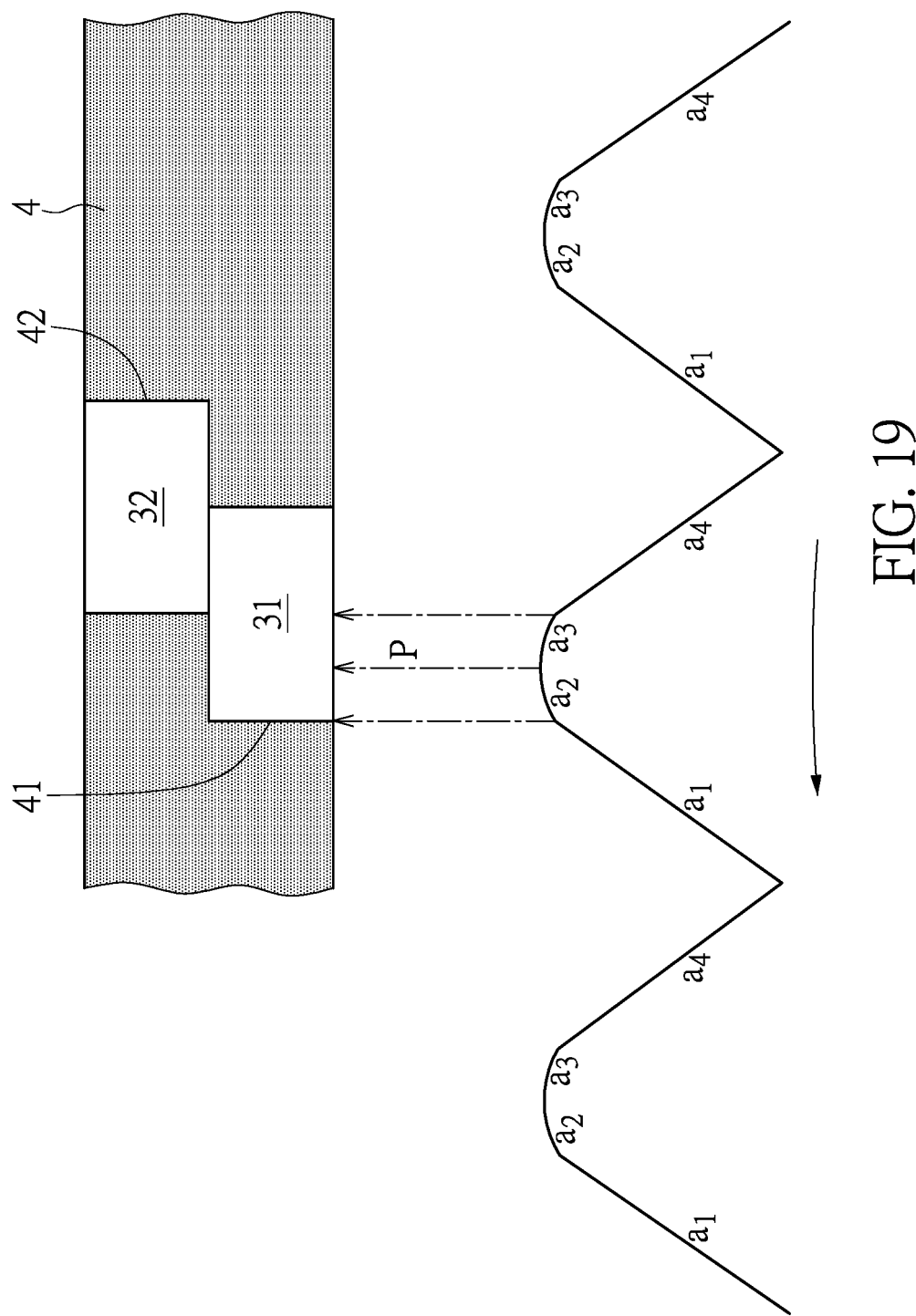
FIG. 19 is a fragmentary schematic view showing the relationship between the parallel light or the near parallel light and the optical sensing module when the light-guiding grating wheel of the scanning light-guiding encoder by forward focusing provided by the second embodiment of the instant disclosure rotates to a fourth position.
Figure 20:
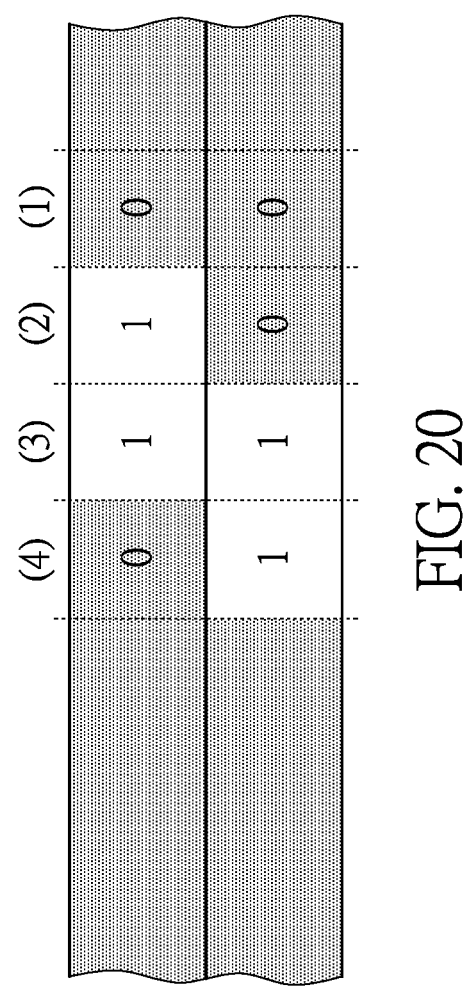
FIG. 20 is a schematic view of the signal generated by the grating and the optical sensing module of the scanning light-guiding encoder by forward focusing provided by the second embodiment of the instant disclosure.

Reference is next made to FIG. 16 to FIG. 20, in which FIG. 16 to FIG. 19 are fragmentary schematic views showing the relationship between the parallel light or the near parallel light P and the optical sensing module 3 when the light-guiding grating wheel 1 of the scanning light-guiding encoder by forward focusing E provided by a second embodiment of the instant disclosure rotates to different positions, i.e., from the first position (1) to the fourth position (4). FIG. 20 is a schematic view of the signal generated by the optical sensing module 3 in the second embodiment of the instant disclosure.

Figure 16:
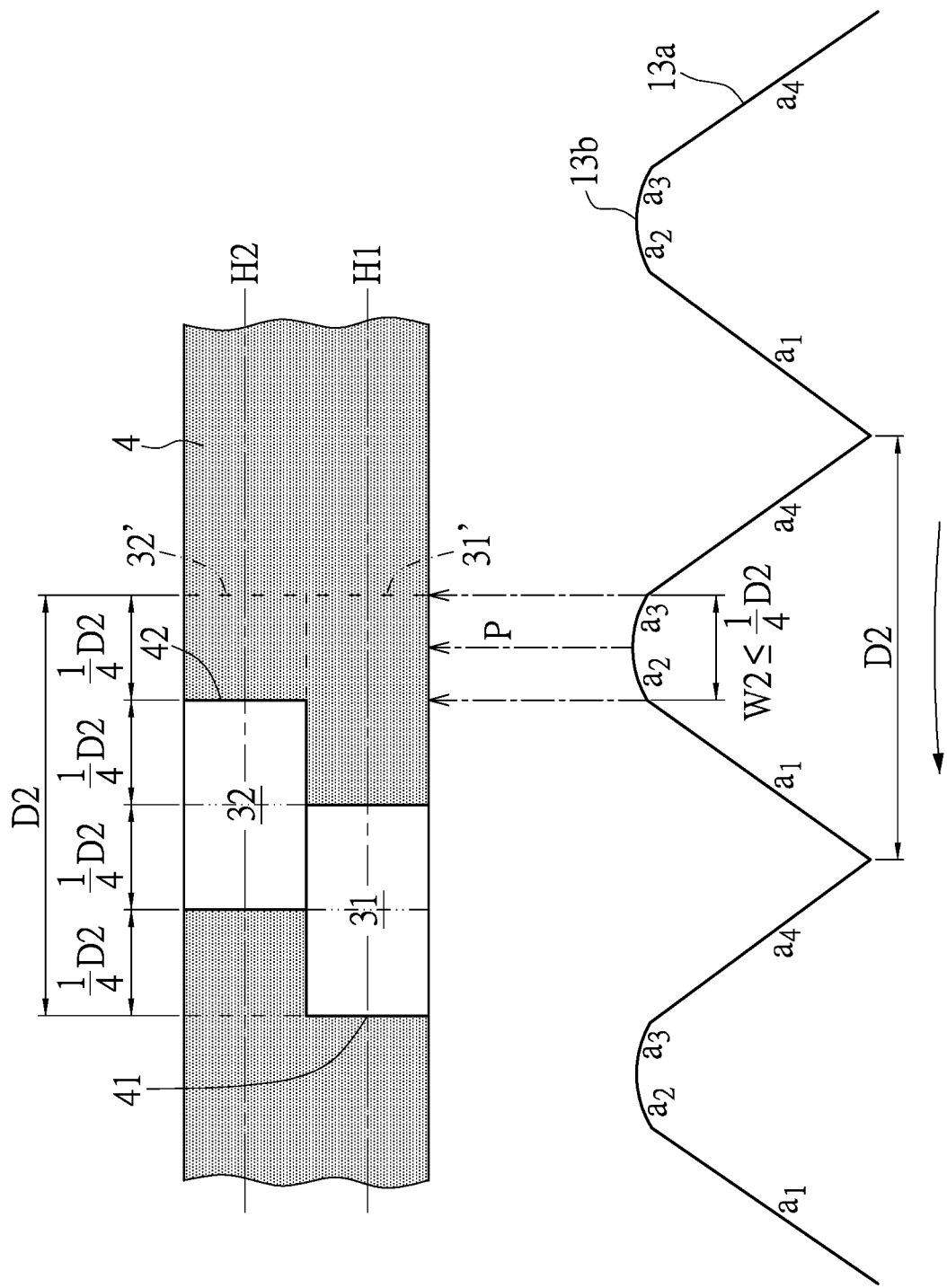
FIG. 16 is a fragmentary schematic view showing the relationship between the parallel light or the near parallel light and the optical sensing module when the light-guiding grating wheel of the scanning light-guiding encoder by forward focusing provided by a second embodiment of the instant disclosure rotates to a first position.

In FIG. 16 to FIG. 19, the first sensing element 31' and the second sensing element 32' of the optical sensing module 3 have a first exposed sensing area 31 and a second exposed sensing area 32 exposed by the first opening 41 and the second opening 42 of the grating 4 respectively. The first exposed sensing area 31 and the second exposed sensing area 32 are divided into a plurality of coding areas, and the width W2 of the parallel light or near-parallel light P is smaller than or equal to the width of each coding area. Referring to FIG. 16, the first exposed sensing area 31 and the second exposed sensing area 32 each includes two coding areas each having a width of ¼ D2.

In other words, in the second embodiments, the parallel light or near-parallel light P emitted from the annular light-reflecting surface 12 has a width W2 smaller or equal to ¼ of the width D3 of the optical sensing module 3 having the first sensing element 31' and the second sensing element 32', i.e., W2≤¼ D2. The ratio of the width W2 to the width D2 of the light-guiding grating wheel 1 of the embodiment shown in FIG. 16 to FIG. 19 is W2=¼ D2. In addition, in the present embodiment, the width of the first exposed sensing area 31 and the second exposed sensing area 32 is twice that of the width W2 of the parallel light or near-parallel light P, i.e., the first exposed sensing area 31 and the second exposed sensing area 32 each has a width of ½ D2. Furthermore, the first exposed sensing area 31 and the second exposed sensing area 32 are offset relative to each other, i.e., the first exposed sensing area 31 and the second exposed sensing area 32 are offset for a distance of ¼ D2 along the direction of the horizontal lines H1 and H2.

As shown in FIG. 16, the light-guiding grating wheel 1 rotates to a first position (1). Neither the first exposed sensing area 31 nor the second exposed sensing area 32 corresponds to the second surface $a_2$ and third surface $a_3$ which constitute the light-output surface 13b and through which the parallel light or near-parallel light P is emitted. Therefore, as shown in FIG. 20, when the light-guiding grating wheel 1 rotates to the first position (1), the optical sensing module 3 cannot receive any optical signal and generates a [0,0] signal.

Figure 17:
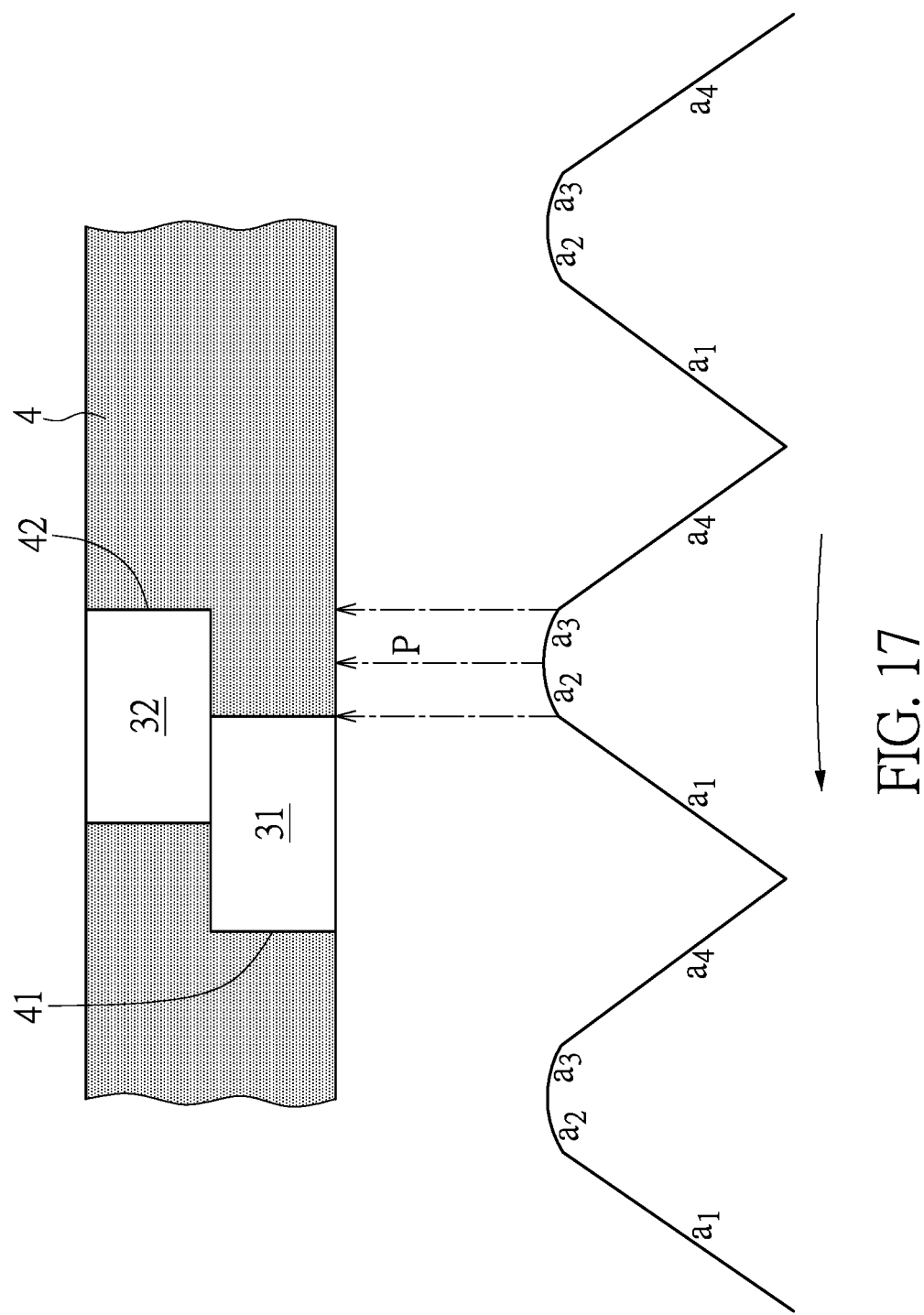
FIG. 17 is a fragmentary schematic view showing the relationship between the parallel light or the near parallel light and the optical sensing module when the light-guiding grating wheel of the scanning light-guiding encoder by forward focusing provided by the second embodiment of the instant disclosure rotates to a second position.

Referring to FIG. 17, the light-guiding grating wheel 1 rotates to a second position (2). The first exposed sensing area 31 corresponds to the first surface $a_1$ which is one of the reflecting surfaces 13a in the light-guiding grating wheel 1 and the fourth surface $a_4$ of the previous aspherical surface 130, and hence the first exposed sensing area 31 cannot receive any optical signal. In addition, the parallel light or near-parallel light P emitted from the second surface $a_2$ and the third surface $a_3$ of the light-guiding grating wheel 1 emits toward the optical sensing module 3 and is projected onto a part of the second exposed sensing area 32 exposed by the second opening 42. Therefore, as shown in FIG. 20, when the light-guiding grating wheel 1 rotates to the second position (2), the optical sensing module 3 generates a [0,1] signal.

Referring to FIG. 18, the light-guiding grating wheel 1 rotates to a third position (3). The parallel light or near-parallel light P emitted from the second surface $a_2$ and the third surface $a_3$ of the light-guiding grating wheel 1 emits toward the optical sensing module 3 and projects onto a part of the first exposed sensing area 31 exposed by the first opening 41 and the second exposed sensing area 32 exposed by the second opening 42. Therefore, as shown in FIG. 20, when the light-guiding grating wheel 1 rotates to the third position (3), the optical sensing module 3 generates a [1,1] signal.

Referring to FIG. 19, the light-guiding grating wheel 1 rotates to a fourth position (4). The parallel light or near-parallel light P emitted from second surface $a_2$ and the third surface $a_3$ emits toward the optical sensing module 3 and projects onto a part of the first exposed sensing area 31 exposed by the first opening 41. The second exposed sensing area 32 is corresponded to the fourth surface $a_4$ which is one of the reflecting surfaces 13a in the light-guiding grating wheel 1, and the first surface $a_1$ of the next aspherical surface 130. Therefore, the second exposed sensing area 32 cannot receive any optical signal. Therefore, as shown in FIG. 20, when the light-guiding grating wheel 1 rotates to the fourth position (4), the optical sensing module 3 generates a [1,0] signal.

As described above, when the light-guiding grating wheel 1 rotates to different positions, based on the design of the reflecting surface 13a and the light-output surface 13b in the aspherical surfaces 130 of optical sensing module 3, and more importantly, based on the design of the dimensions of the first exposed sensing area 31 and the second exposed sensing area 32 in the optical sensing module 3 in cooperation with the reflecting surface 13a and the light-output surface 13b, the light-guiding grating wheel 1 can generate $2^2=4$ sensing signals. Specifically, by adjusting the width W2 of the parallel light or near-parallel light P to be smaller than or equal to the ¼ of the width D2 of the optical sensing module 3 having the first sensing element 31' and the second sensing element 32' (each of the aspherical projections 1020 also has a width D2), i.e., W2≤¼ D1, the resolution of the scanning light-guiding encoder by forward focusing E can be improved.

Third Embodiment

Figure 22:
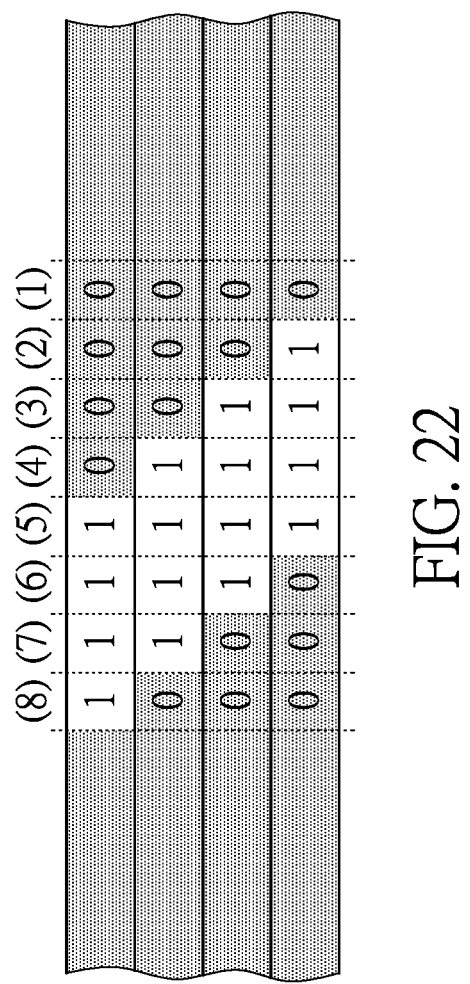
FIG. 22 is a schematic view of the signal generated by the optical sensing module shown in FIG. 21.

Reference is next made to FIG. 21 and FIG. 22, which illustrate the schematic views of the scanning light-guiding encoder by forward focusing E of the third embodiment for generating coding signals. Specifically, FIG. 21 is a fragmentary schematic view of the relationship between the parallel light or the near parallel light and the optical sensing module when the light-guiding grating wheel of the optical scanning light-guiding encoder provided by the third embodiment of the instant disclosure rotates to a first position; and FIG. 22 is a schematic view of the signal generated by the optical sensing module shown in FIG. 21.

Different from the previous embodiments, the optical sensing module 3 has a first sensing element 31', a second sensing element 32', a third sensing element 33' and a fourth sensing element 34' in the present embodiment, each having the same width D3. The first opening 41, the second opening 42, the third opening 43 and the fourth opening 44 of the grating 4 are used to expose the first exposed sensing area 31, the second exposed sensing area 32, the third exposed sensing area 33 and the fourth exposed sensing area 34 which are offset from each other. The first exposed sensing area 31, the second exposed sensing area 32, the third exposed sensing area 33 and the fourth exposed sensing area 34 are divided into a plurality of coding areas, and the width W3 of the parallel light or near-parallel light P is smaller than or equal to the width of each of the coding areas. Referring to FIG. 21, the above exposed sensing areas each includes four coding areas each having a width of ⅛ D2.

In other words, in the present embodiment, the first exposed sensing area 31, the second exposed sensing area 32, the third exposed sensing area 33 and the fourth exposed sensing area 34 each has a width of ½ D3. In addition, the first exposed sensing area 31, the second exposed sensing area 32, the third exposed sensing area 33 and the fourth exposed sensing area 34 are offset from each other at a distance of ⅛ D3 on different horizontal lines H1, H2, H3 and H4.

The width W3 of the parallel light or near-parallel light P emitting from the aspherical surface 130 is smaller than or equal to ⅛ of the width D3 of the optical sensing module 3, i.e., W3≤⅛ D3. The ratio of the width W3 to the width D3 of the light-guiding grating wheel 1 of the embodiment shown in FIG. 21 is W3=⅛ D3. Similar to the previous embodiments, the width of each of the aspherical projections 1020 is the same as the width D3 of the optical sensing module 3. For example, in the state shown in FIG. 21, the parallel light or near-parallel light P projects onto the optical sensing module 3 and allows the optical sensing module 3 to generate a signal of [0,0,0,0]. In the third embodiment, the signal generated by the optical sensing module 3 in accordance with the rotation position of the light-guiding grating wheel 1 is shown in FIG. 22. Therefore, in the present embodiment, the optical scanning light-guiding encoder E can generate $2^3=8$ signals.

Fourth Embodiment

Figure 24:
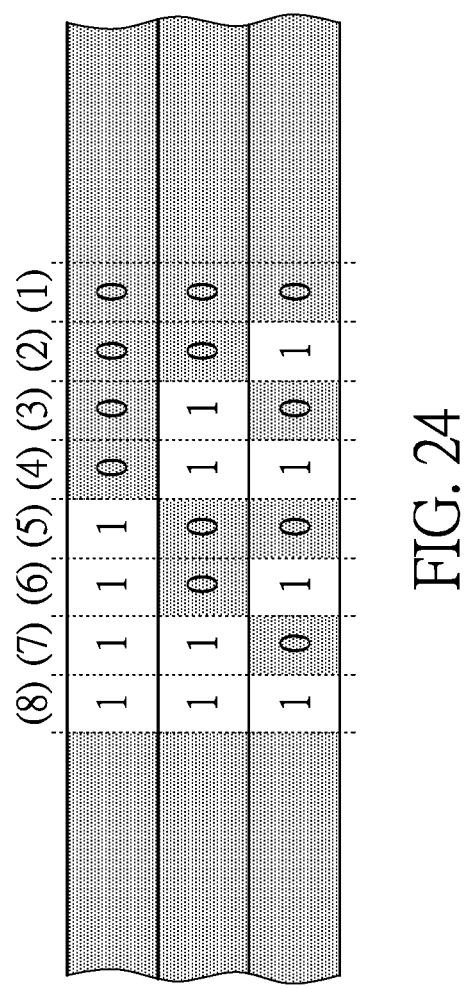
FIG. 24 is a schematic view of the signal generated by the optical sensing module shown in FIG. 23.

Reference is next made to FIG. 23 and FIG. 24, in which FIG. 23 is a fragmentary schematic view of the relationship between the parallel light or the near parallel light and the optical sensing module when the light-guiding grating wheel of the optical scanning light-guiding encoder provided by the fourth embodiment of the instant disclosure rotates to a first position; and FIG. 24 is a schematic view of the signal generated by the optical sensing module shown in FIG. 23.

Referring to FIG. 23, in the present embodiment, the optical sensing module 3 of the optical scanning light-guiding encoder E includes the first sensing element 31', the second sensing element 32' and the third sensing element 33', which are strip-like and arranged parallel to each other. The optical sensing module 3 having the first sensing element 31', the second sensing element 32' and the third sensing element 33' has a width D4. The first openings 41a-41d of the grating 4 expose specific areas of the first sensing element 31' and form the first exposed sensing areas 31a-31d; the second openings 42a, 42b expose specific areas of the second sensing element 32' and form the second exposed sensing areas 32a, 32b, and the third opening 43 exposed a specific area of the third sensing element 33' and form the third exposed sensing area 33. The dimension of each of the exposed sensing areas is shown in FIG. 23.

Specifically, the first exposed sensing areas 31a-31d, the second exposed areas 32a, 32b and the third exposed sensing area 33 are divided into a plurality of coding areas. The width W4 of the parallel light or near-parallel light P is smaller than or equal to the width of each of the coding areas. Referring to FIG. 23, the first exposed sensing areas 31a-31d, the second exposed sensing areas 32a, 32b and the third exposed sensing area 33 respectively include four, two and one coding areas each having a width of ⅛ D2.

In the present embodiment, the width W4 of the parallel light or near-parallel light P is smaller or equal to ⅛ of the width D4 of the optical sensing module 3, i.e., W4≤⅛ D4. As mentioned in the previous embodiments, the width of each of the aspherical projections 1020 is equal to the width D4 of the optical sensing module 3. For example, in the state shown in FIG. 23, the parallel light or near-parallel light P projects onto the optical sensing module 3 and allows the optical sensing module 3 to generate a signal of [0,0,0]. In the fourth embodiment, the signals generated by the optical sensing module 3 in accordance with the rotation position of the light-guiding grating wheel 1 are shown in FIG. 24. In the fourth embodiment, the optical scanning light-guiding encoder E can generate $2^3=8$ signals.

In sum, the advantage of the instant disclosure is that the scanning light-guiding encoder by forward focusing E employs the design of "each of the sensor elements has an exposed sensing area, and the plurality of exposed sensing areas of the plurality of sensor elements are offset in the transverse direction and are arranged along a plurality of different horizontal lines parallel to each other", and hence, the parallel light or near parallel light P projected onto the optical sensing module 3 can cooperate with the exposed sensing areas of the plurality of sensor elements. Therefore, the resolution of the encoder can be improved without increasing the dimension of the light-guiding grating wheel 1 and the number of the aspherical projections 1020. In addition, the optical scanning light-guiding encoder by forward focusing E can achieve adjustable width of the parallel light or the near-parallel light P by adjusting the curvature of a top curved surface of the aspherical projections 1020, or by setting the width of each of the aspherical projections 1020 of the light-guiding body 101 same as the width of the optical sensing module 3 for further improving the resolution of the optical scanning light-guiding encoder by forward focusing E.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A scanning light-guiding encoder, comprising:
    a light-guiding grating wheel including a light-guiding body and an outer gear-like structure disposed on an outer surrounding surface of the light-guiding body;
    a light-emitting module surrounded by the light-guiding grating wheel;
    an optical sensor module including a plurality of sensor elements adjacent to the light-guiding grating wheel, each of the plurality of sensor elements having an exposed sensing area, each of the exposed sensing areas being offset from and being arranged parallel to another adjacent exposed sensing area; and
    a grating disposed between the light-guiding grating wheel and the optical sensor module, the grating includes a plurality of slits for exposing the plurality of exposed sensing areas.

2. The scanning light-guiding encoder according to claim 1, wherein each of the slits is offset from another adjacent slit.

3. The scanning light-guiding encoder according to claim 1, wherein the light-guiding body having an inner surrounding surface which is an annular light-receiving surface, the outer gear-like structure having an annular light-output surface formed by a plurality of spherical or aspherical surfaces connected sequentially and having a principal axis, and the outer gear-like structure being formed by a plurality of aspherical projections connected sequentially, wherein an incident light generated by the light-emitting module enters the light-guiding grating wheel through the annular light-receiving surface and passes through the annular light-output surface of the outer gear-like structure for forming a plurality of rays of light parallel or near parallel to each other that are projected onto the optical sensor module.

4. The scanning light-guiding encoder according to claim 1, wherein the light-guiding grating wheel includes an inner gear-like structure disposed on an inner surrounding surface of the light-guiding body, and the light-guiding body having an outer surrounding surface which is an annular light-output surface, the inner gear-like structure having an annular light-incident surface formed by a plurality of spherical or aspherical surfaces connected sequentially and having a principal axis, and the inner gear-like structure is formed by a plurality of aspherical projections connected sequentially, wherein an incident light generated by the light-emitting module enters the light-guiding grating wheel through the annular light-incident surface of the inner gear-like structure and passes through the annular light-output surface for forming a plurality of light parallel or near parallel to each other that are projected onto the optical sensor module.

5. The scanning light-guiding encoder according to claim 1, wherein the light-guiding grating wheel includes an inner gear-like structure disposed on an inner surrounding surface of the light-guiding body, and the outer gear-like structure having an annular light-output surface formed by a plurality of spherical or aspherical surfaces connected sequentially and having a principal axis, the outer gear-like structure being formed by a plurality of aspherical projections connected sequentially, the inner gear-like structure having an annular light-receiving surface formed by a plurality of spherical or aspherical surfaces connected sequentially and having a principal axis, and the inner gear-like structure being formed by a plurality of aspherical projections connected sequentially, wherein an incident light generated by the light-emitting module enters the light-guiding grating wheel through the annular light-receiving surface of the inner gear-like structure and passes through the annular light-output surface of the outer gear-like structure for forming a plurality of rays of light parallel or near parallel to each other that are projected onto the optical sensor module.

6. The scanning light-guiding encoder according to claim 1, wherein the light-guiding grating wheel has a plurality of aspherical projections, each of the aspherical projections having an aspherical surface, when the light-guiding grating wheel rotates, an incident light generated by the light-emitting module passes through a part of the plurality of aspherical surfaces or is reflected by the other part of the plurality of aspherical surfaces.

7. The scanning light-guiding encoder according to claim 6, wherein each of the aspherical surfaces of the light-guiding grating is formed by two reflecting surfaces and a light-output surface connected between the two reflecting surfaces.

8. The scanning light-guiding encoder according to claim 7, wherein when the light-guiding grating wheel rotates, a part of the incident light passes through the light-output surface.

9. The scanning light-guiding encoder according to claim 7, wherein a part of the incident light is reflected by the reflecting surfaces.

10. The scanning light-guiding encoder according to claim 7, wherein a parallel or near parallel rays of light have a width equal to a width of the light-output surface.

11. The scanning light-guiding encoder according to claim 6, wherein each of the exposed sensing areas of the sensor elements is divided into a plurality of subareas, and a width of parallel or near parallel light formed by a plurality of rays of light parallel or near parallel to each other is not greater than a width of each of the plurality of subareas.

12. A scanning light-guiding encoder, comprising:
    a light-guiding grating wheel including a light-guiding body and a gear-like structure, wherein the gear-like structure has a plurality of aspherical projections;
    a light-emitting module surrounded by the light-guiding grating wheel;
    an optical sensing module adjacent to the light-guiding grating wheel; and
    a grating disposed between the light-guiding grating wheel and the optical sensor module, the grating includes a plurality of slits extending straight and being offset from each other;
    wherein an incident light generated by the light-emitting module passes through the light-guiding grating wheel for forming parallel or near parallel light formed by a plurality of rays of light parallel or near parallel to each other and projected onto the optical sensing module and
    wherein a curvature of a top curved surface of each of the aspherical projections correlates to a width of the parallel near parallel light.

13. A scanning light-guiding encoder, comprising:
a light-guiding grating wheel including a light-guiding body and a gear-like structure, wherein the gear-like structure has a plurality of projections;
a light-emitting module surrounded by the light-guiding grating wheel;
an optical sensing module adjacent to the light-guiding grating wheel; and
a grating disposed between the light-guiding grating wheel and the optical sensor module, the grating includes a plurality of slits extending straight and being offset from each other;
wherein a width of each of the projections of the gear-like structure is equal to a width of the optical sensing module.

14. The scanning light-guiding encoder according to claim 13, wherein the projections are aspherical projections or spherical projections.

15. The scanning light-guiding encoder according to claim 2, wherein each of the slits is rectangular.

16. The scanning light-guiding encoder according to claim 2, wherein an area of each of the slits is equal to and overlaps completely with an area of a corresponding one of the exposed sensing areas.

* * * * *